(12) United States Patent
Hattori et al.

(10) Patent No.: US 8,170,106 B2
(45) Date of Patent: May 1, 2012

(54) VIDEO DISPLAYING APPARATUS AND VIDEO DISPLAYING METHOD

(75) Inventors: Hideharu Hattori, Kawasaki (JP); Koichi Hamada, Yokohama (JP); Yasuhiro Akiyama, Ome (JP); Masanori Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1095 days.

(21) Appl. No.: 12/021,423

(22) Filed: Jan. 29, 2008

(65) Prior Publication Data

US 2008/0204603 A1    Aug. 28, 2008

(30) Foreign Application Priority Data

Feb. 27, 2007  (JP) ................................. 2007-046388

(51) Int. Cl.
*H04N 7/12*  (2006.01)

(52) U.S. Cl. .......... 375/240.16; 375/240.12; 375/240.01

(58) Field of Classification Search ............ 375/240.01–240.29; 345/690–694; 348/451–452, 699–702
See application file for complete search history.

(56) References Cited

U.S. PATENT DOCUMENTS

| | | | | |
|---|---|---|---|---|
| 6,429,833 B1 * | 8/2002 | Ryeom et al. | .................... | 345/63 |
| 6,476,875 B2 * | 11/2002 | Correa et al. | ................. | 348/607 |
| 6,501,446 B1 * | 12/2002 | De Haan et al. | ................ | 345/63 |
| 6,661,470 B1 * | 12/2003 | Kawamura et al. | ........... | 348/699 |
| 6,894,664 B2 * | 5/2005 | Thebault et al. | ................ | 345/60 |
| 7,023,450 B1 * | 4/2006 | Weitbruch et al. | ............ | 345/593 |
| 2002/0031180 A1 | 3/2002 | Weitbruch et al. | | |
| 2004/0046716 A1 * | 3/2004 | Chupeau et al. | ................ | 345/60 |
| 2007/0041446 A1 * | 2/2007 | Seong et al. | ............. | 375/240.16 |
| 2008/0170159 A1 * | 7/2008 | Akiyama et al. | ............. | 348/608 |
| 2008/0253669 A1 * | 10/2008 | Hamada et al. | ............... | 382/236 |
| 2010/0002005 A1 * | 1/2010 | Nagaishi et al. | .............. | 345/522 |
| 2010/0013873 A1 * | 1/2010 | Kondo et al. | ................. | 345/691 |
| 2011/0228169 A1 * | 9/2011 | Kiuchi et al. | ................. | 348/699 |

FOREIGN PATENT DOCUMENTS

| | | |
|---|---|---|
| JP | 08-211848 | 8/1996 |
| JP | 2002-123211 | 4/2002 |

* cited by examiner

*Primary Examiner* — Chi Pham
*Assistant Examiner* — Feben M Haile
(74) *Attorney, Agent, or Firm* — Antonelli, Terry, Stout & Kraus, LLP.

(57) ABSTRACT

Apparatus including: a unit detecting a motion vector, among plural number of fields included in motion pictures, or fields, produced from the plural number of fields; a unit for converting the motion pictures into light-emission data for sub-fields; a unit for reconstructing the light-emission data for sub-fields, via calculating using the motion vector; and a unit for displaying the picture using the light-emission data outputted from the sub-field reconstruction unit, wherein the sub-field reconstruction unit selects the motion vector ending at a reconstruction target pixel of other one (1) field, among the motion vectors detected by the motion vector detection unit, and calculates a position vector, by multiplying a predetermined function onto this, and thereby reconstructing light-emission data for one (1) sub-field of the reconstruction target pixel, using the light-emission data for sub-fields corresponding to the one (1) sub-fields within the pixel, which is indicated by the position vector.

16 Claims, 18 Drawing Sheets

1310
SF IS NOT YET SETUP

1320
SF IS SETUP

1311
SF IS NOT YET SETUP

1321
SF IS SETUP

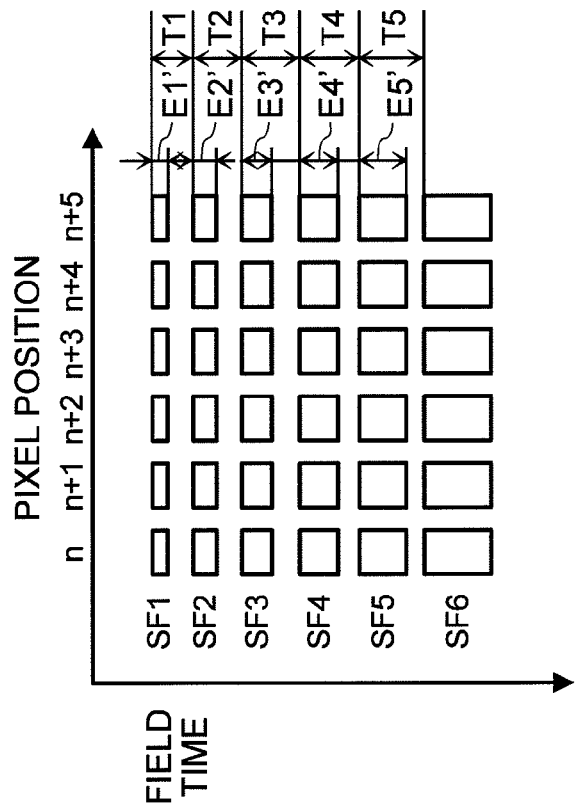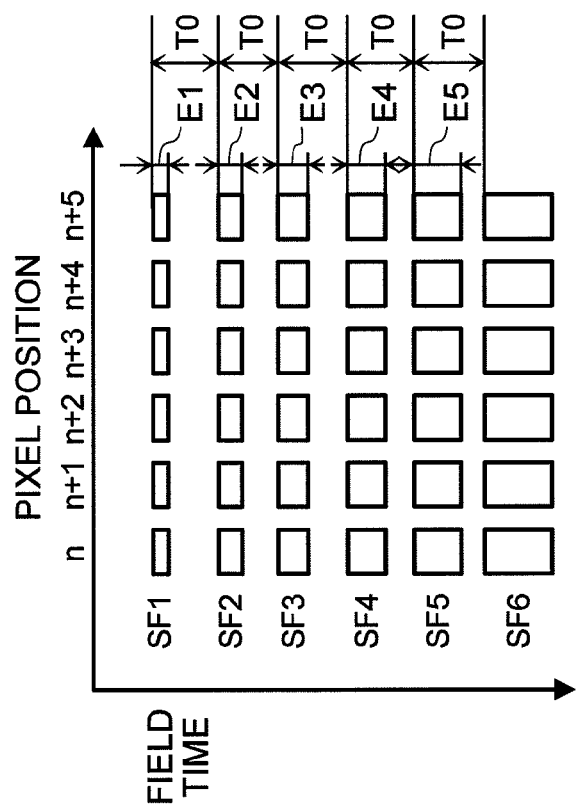

VIDEO DISPLAYING APPARATUS AND VIDEO DISPLAYING METHOD

BACKGROUND OF THE INVENTION (1) Field of the Invention

The present invention relates to a video displaying apparatus and a video displaying method, for dividing a field into plural numbers thereof on the video display, time-sequentially, thereby achieving a gradation display.

(2) Description of the Related Arts

When dividing one (1) piece of field into a plural number of screens (hereinafter, those being called "sub-fields (SF)"), being different in weighting of brightness thereof, so as to control emission or non-emission of light in each sub-field, there are cases of generating a disturbance of gradation and/or a blur of moving picture, being called a "dynamic false contour", when displaying the moving picture, thereby losing or reducing the definition of display. It is already known that this is generated due to the fact that eyes of a human being follow the moving subject.

As a method for dissolving the generation of this dynamic false contour, for example, in Japanese Patent Laying-Open No. Hei 8-211848 (1996) is disclosed a technology of correcting the light-emitting position on each sub-field of display data to the pixel position on each sub-field, while detecting a motion vector from the display data between the frames or between the fields.

And, also as another method for dissolving the generation of this dynamic false contour, for example, in Japanese Patent Laying-Open No. 2002-123211 (2002) is disclosed a technology of calculating the coordinates for dragging the sub-field, from the motion vector and the position of light-emitting centroid on the sub-field, and thereby re-coding the sub-field.

SUMMARY OF THE INVENTION

When correcting the light-emission position on the sub-field in accordance with the conventional method, in a part of pixels, there are generated cases where the sub-field cannot be re-determined. This causes a great change on the brightness of the pixel, or generating a line-like pattern due to generation of the difference in brightness, but not existing within the picture, etc.; i.e., correction of the dynamic false contour comes into failure, and there is a problem of deteriorating the picture quality.

Also, when calculating the coordinates, to which the sub-field should be dragged, from the motion vector and the position of light-emitting centroid of the sub-field, within the conventional method, then there are problems that processes necessary for calculating the light-emitting centroid of the field come to be large an amount thereof, as well as, the circuit scale thereof, and that it is difficult to conduct the processed without delaying.

The present invention is accomplished, by taking the problems mentioned above into the consideration thereof, and an object thereof is to prevent the picture quality from being deteriorated, more preferably.

According to one embodiment of the present invention, there is provided a video displaying apparatus, for dividing one (1) field period within an input motion picture into a plural number of sub-field periods, and thereby controlling light-ON or light-OFF of the plural number of sub-field periods during each period, comprising: an input unit, which is configured to input a motion picture; a motion vector detection unit, which is configured to detect a motion vector starting from a pixel of one (1) field and ending at a pixel of other one (1) field, among a plural number of fields included in the motion pictures, which are inputted into said input unit, or fields, which are produced from said plural number of fields; a sub-field conversion unit, which is configured to convert the motion pictures, which are inputted to said input unit, into light-emission data for sub-fields;

a sub-field reconstruction unit, which is configured to reconstruct the light-emission data for sub-fields, which is outputted from said sub-field conversion unit, through a calculating process with using the motion vector, which is detected by said motion vector detection unit; and a display unit, which is configured to display the picture with using the light-emission data, which is outputted from said sub-field reconstruction unit, wherein said sub-field reconstruction unit selects the motion vector ending at a reconstruction target pixel of said other one (1) field, among the motion vectors detected by said motion vector detection unit, and calculates a position vector, by multiplying a predetermined function onto the motion vector ending at said reconstruction target pixel, whereby reconstructing the light-emission data for one (1) sub-field of said reconstruction target pixel, with using the light-emission data for sub-fields corresponding to said one (1) sub-fields within the pixel, which is indicated by said position vector, upon basis of said reconstruction target pixel.

With this, it is possible to prevent the picture quality from being deteriorated, preferably much more.

BRIEF DESCRIPTION OF THE DRAWINGS

Those and other features, objects and advantages of the present invention will become more apparent from the following description when taken in conjunction with the accompanying drawings wherein:

FIG. 18 is a view for explaining an example of the structures of the sub-field, according to an embodiment of the present invention.

DETAILED DESCRIPTION OF THE PREFERRED EMBODIMENTS

Figure 1A:
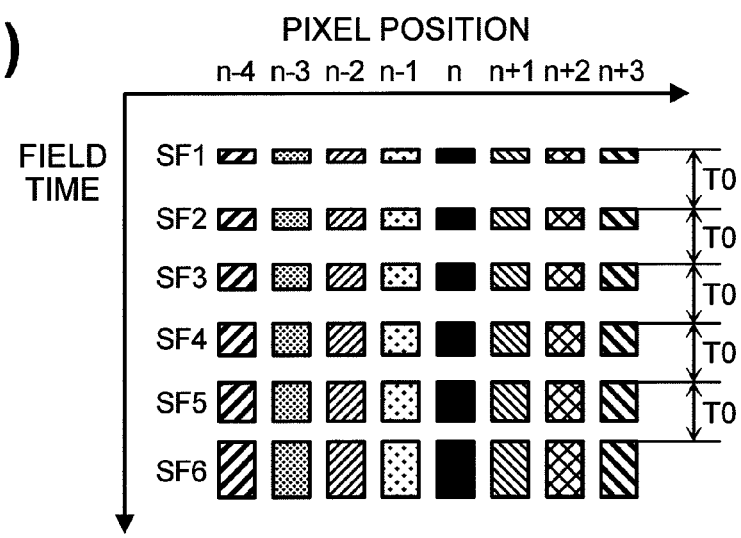
FIGS. 1(a) to 1(c) are views for explaining an example of a reconstructing method of sub-field, according to an embodiment of the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

Hereinafter, embodiments according to the present invention will be fully explained by referring to the attached drawings.

However, in each drawing, it is assumed that a constituent element attached with a same reference numeral has the same function thereto.

Also, in the description given below, description "light-emission of sub-field" also includes a meaning "light-emission of a pixel within a sub-field period".

Also, in the description and drawings given below, when only a scalar (amount) is described as a value of the vector, it is assumed that an exemplary is shown of a quantity of motion in the horizontal direction of two-dimensional vector. Thus, when describing only "6", for example, then it indicates that the motion vector is (x,y)=(+6,0), in case where the horizontal direction is "x" and the vertical direction is "y".

Figure 10:
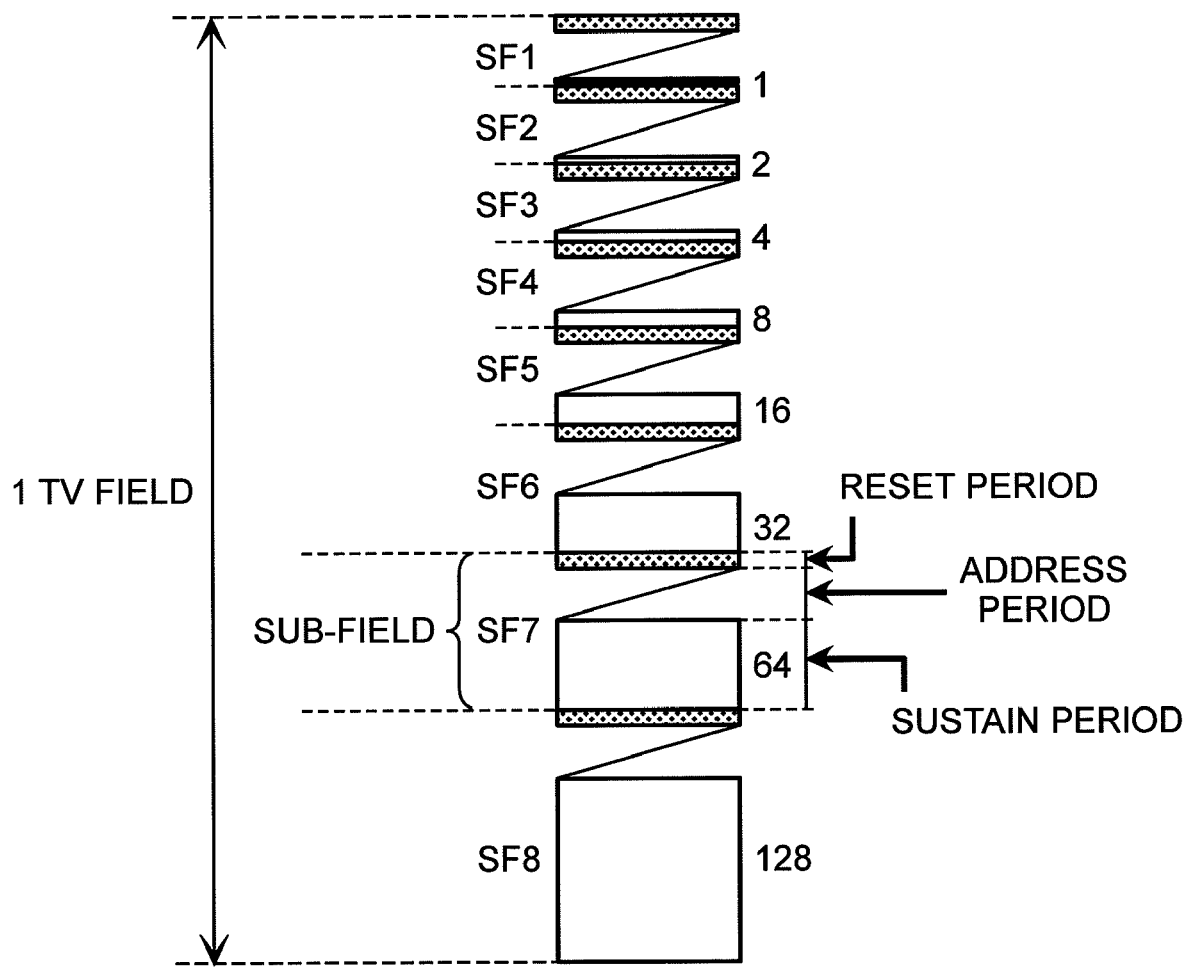
FIG. 10 is a view for explaining an example of a gradation presenting method with using the sub-field.

First of all, explanation will be given on a gradation presenting method for a displaying apparatus, which presents the gradation with using a sub-field. As is shown in FIG. 10, within the said apparatus, one (1) piece of a field is constructed with "N" pieces of sub-fields, and upon each of the sub-fields is conducted weighting is conducted, such as, raising 2 to $N^{th}$ power (i.e., $2^N$), for example. This weighting may be that of other methods depending on the design thereof. In the example shown in FIG. 10, the weighting is conducted from a side of small brightness, such as, 2 to $0^{th}$ power ($2^0$), 2 to $1^{st}$ power ($2^1$), . . . 2 to $(N-1)^{th}$ power ($2^{N-1}$), for example. Also, they are called "SF1", "SF2", . . . "SFn", from a starting side of one (1) TV field period. FIG. 10 shows an example where n=8. The said displaying apparatus presents the gradation within one (1) field, by making selections between light-emission or non-light-emission, in plural numbers thereof for those sub-fields. And, the brightness the retina of a human being can sense is the sum of brightness of the plural number of sub-fields, each of which emits the light.

Since the light-emissions of the sub-fields differs from in time-sequence, and when the eyes follow the subject, which moves within the moving picture, while the position of the light-emitting sub-fields changes greatly, on the pixels neighboring with each other within one (1) field, then the dynamic false contour is generated.

Figure 11A:
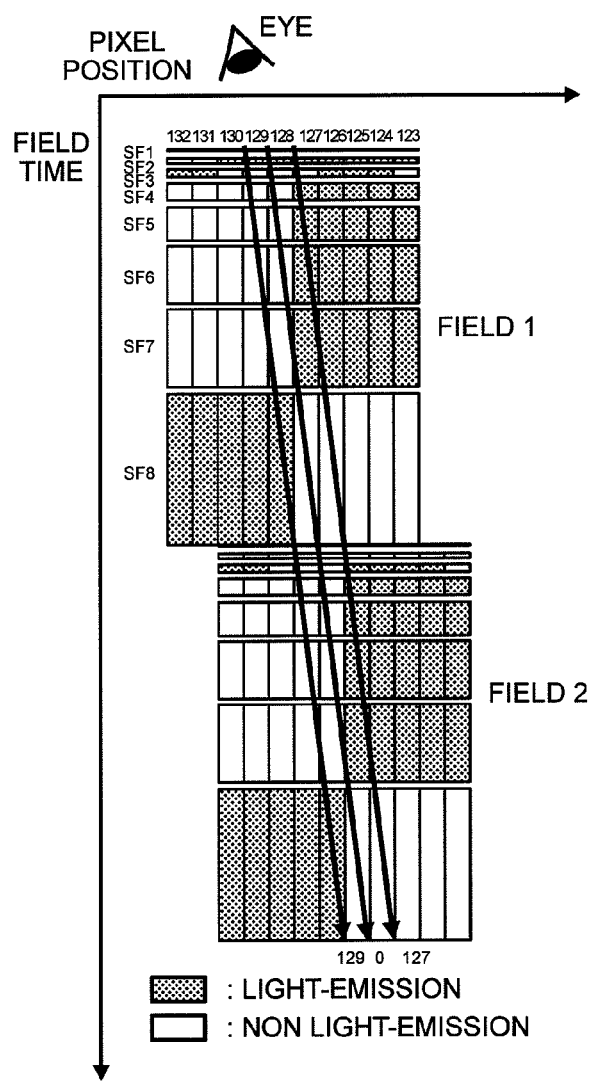
FIG. 11 is a view for explaining the mechanism of generating the dynamic false contour.
Figure 11B:
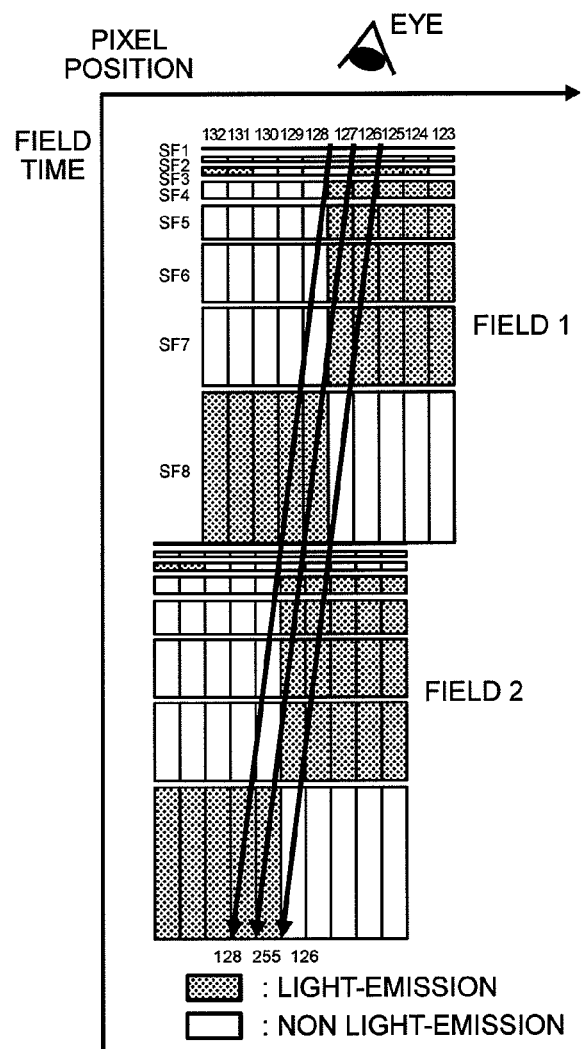

Next, an example of the mechanism for generating this dynamic false contour is shown in FIGS. 11(a) and 11(b). In those FIGS. 11(a) and 11(b), the vertical axis shows the time while the horizontal axis shows the pixel position. Those 11(a) and 11(b) show a case where the number "n" of sub-field is eight (8), and wherein the a series of pixels are displayed, each being higher by one (1) in the brightness thereof in the horizontal direction, i.e., into the left-hand direction.

FIG. 11(a) shows a case where the said series of pixel displays are shifted into the right-hand direction by two (2) pixels, within a second field period, comparing to a first field period.

Herein, the pixels of brightness 127, 128 and 129 shown in FIG. 11(a) can be seen for the human eyes, inherently, to be those of brightness 127, 128 and 129, respectively, when they are in the condition of still picture.

However, in case of the moving picture, then a line of sight (i.e., the human eyes) follows the movement of the picture, as is shown by an arrow in FIG. 11(a). With this, the light-emitting periods of the sub-fields, which are recognized by the human eyes, differ from those in the case of the still picture. In the example shown in FIG. 11(a), they are recognized by the human eyes, as the pixels of brightness 127, 128 and 129, when being the still picture, but as the pixels of brightness 127, 0 and 129, when displaying the moving picture. In this manner, the human eyes recognize the pixel of brightness 0, which is not displayed, inherently.

Also, as shown in FIG. 11(b), in case when the second field period is shifted by two (2) pixels in the left-hand side from the first field period within a series of pixel displays, the pixels of 126, 127 and 128 in the brightness thereof when being the still picture, are recognized by the human eyes, to be the pixels of brightness 126, 255 and 128, when displaying the moving picture. In this manner, the human eyes recognize the pixel of brightness 255, which is not displayed, inherently.

Figure 12:
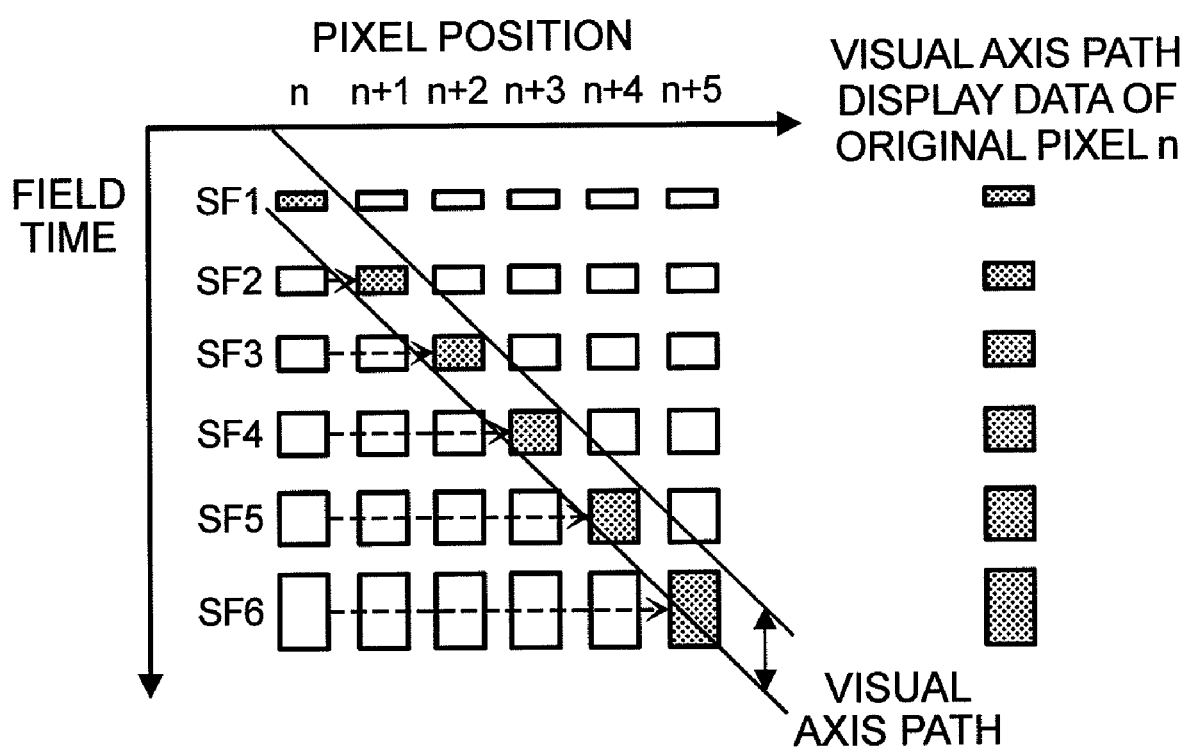
FIG. 12 is a view for explaining the sub-field reconstructing method according to the conventional method.

Next, explanation will be made on the conventional correcting method of the sub-field, by referring to FIG. 12. This FIG. 12 shows the display data when the number "N" of the sub-field is six (6), while showing the horizontal positions of the pixels on the horizontal axis and the time on the vertical axis thereof. Herein, consideration will be paid on the transition of the light-emitting condition of the sub-field on the pixel "n" within the display data shown in FIG. 12. In this FIG. 12, when the display data is shifted by six (6) pixels in the horizontal direction, i.e., when shifting by a vector value +6, in case when displaying the moving picture, the light-emitting sub-fields, which can be actually recognized by the retina, are within a region defined between two (2) pieces of oblique lines. As was explained in FIGS. 11(a) and 11(b), the value of brightness, which is obtained by integrating the light-emitting sub-fields on the retina when displaying the moving picture, differs from the value of brightness when assuming to be the still picture. With the conventional method, the dynamic false contour is corrected by changing the light-emitting positions of the plural number of sub-fields, which should be disposed on the same pixels when assuming to be the still picture, to the light-emitting positions of the sub-fields of the pixel positions within a path of line of sight or visual axis.

Next, explanation will be made when the sub-field cannot be reset in a part of pixels, within the conventional correcting method of the sub-field, by referring to FIGS. 13-1(a) to 13-1(c).

Figure 13A:
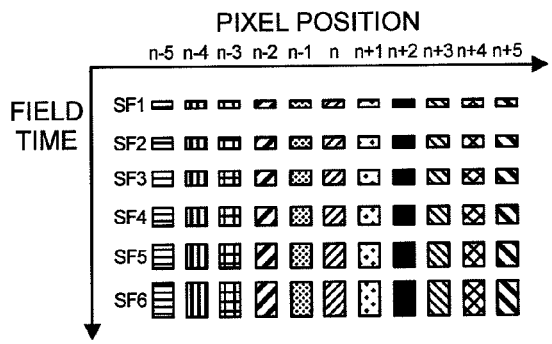
FIGS. 13(a) to 13(f) is a view for explaining an example of light-emitting condition of a sub-field, according to the conventional method and an embodiment of the present invention.
Figure 13D:
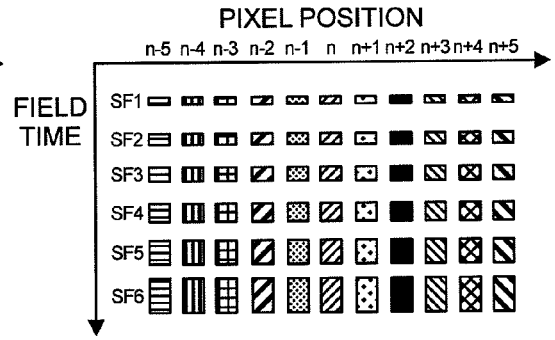
Figure 13B:
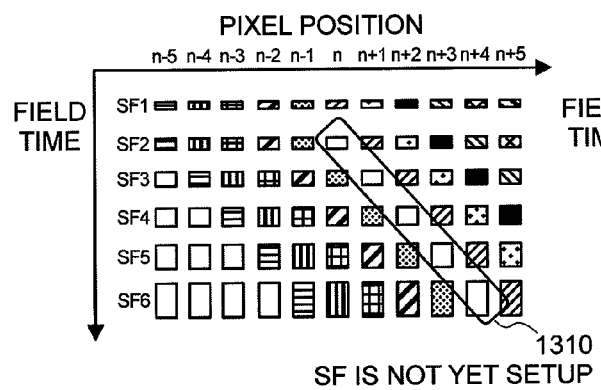
Figure 13E:
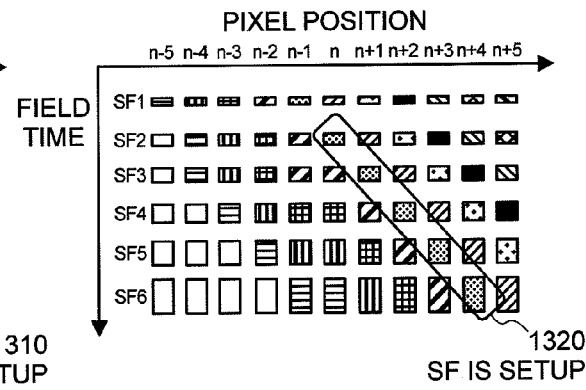
Figure 13C:
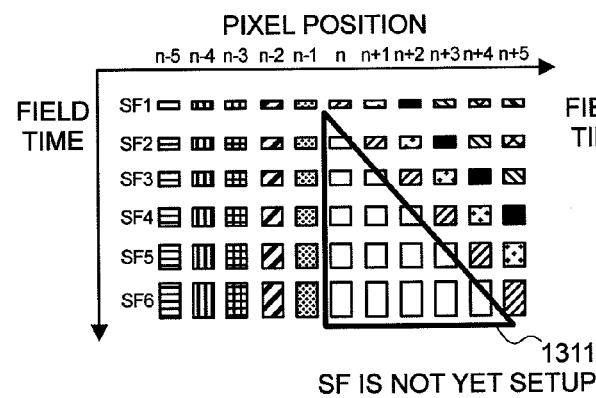
Figure 13F:
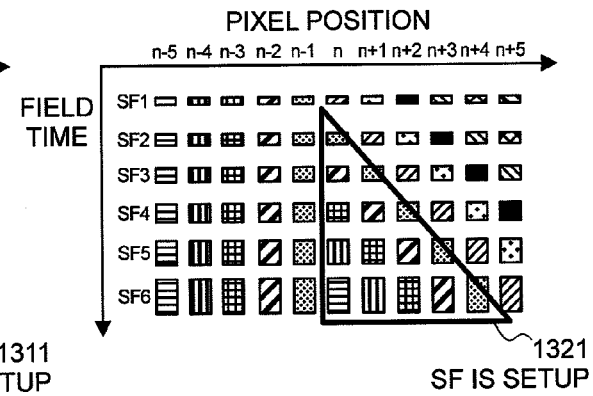

FIGS. 13(a) to 13(c) show the display data when the number "N" of sub-field is six (6), while showing the pixels on the horizontal axis and the time on the vertical axis thereof. The sub-fields belonging to the same pixel is indicated by the same pattern. Herein, in FIG. 13(a), when the pixels (n−5) to (n−1) are shifted by five (5) pixels in the horizontal direction, and when the pixels n to (n+5) are shifted by six (6) pixels in the horizontal direction, then they are as shown in FIG. 13(b) if changing the light-emitting positions of the sub-fields in accordance with the conventional method, i.e., there is generated a portion where no sub-field is set up, such as, an area or region 1310 indicted by a frame-line therein. Also, in FIG. 13(a), when the pixels (n−5) to (n−1), being the pixels of a still region, such as, a background, are shifted by zero (0) pixel in the horizontal direction, and when the pixels n to (n+5), being the pixels in a moving region, are shifted by six (6) pixels in the horizontal direction, then they are as shown in FIG. 13(c) if the light-emitting positions of the sub-fields are changed in accordance with the conventional method, i.e., there is also generated a portion where no sub-field is set up, such as, an area or region 1311 indicted by a triangle frame-line therein. For that reason, the brightness of pixel changes greatly, and there is generated a patter, such as, a line made up with pixels different in the brightness, which does not exist within the picture. Accordingly, in case of the example mentioned above, there are generated the pixels, on which no sub-field is set up, with the conventional correcting method of the sub-field, and they deteriorate the picture quality.

Standing upon the mentioned above, explanation will be made hereinafter, on each of the embodiments according to the present invention.

<Embodiment 1>

First of all, explanation will be made on a first embodiment of the present invention, by referring to the drawings attached herewith.

The first embodiment of the present invention is that relating to a displaying method, wherein the distance is equal to each other between the sub-fields on light-emission start time, as is shown in FIG. 18(a). Herein, FIGS. 18(a) and 18(b) show the display data when the number "N" of sub-fields is six (6), while showing the horizontal positions of pixels on the horizontal axis and the time on the vertical axis thereof.

Herein, in FIG. 18(a), the distance is "T0", i.e., constant, between the sub-fields on the light-emission start time, irrespective of the light-emission periods for each of the sub-fields, E1, E2, E3, E4 and E5.

Hereinafter, explanation will be made in details thereof.

Figure 1B:
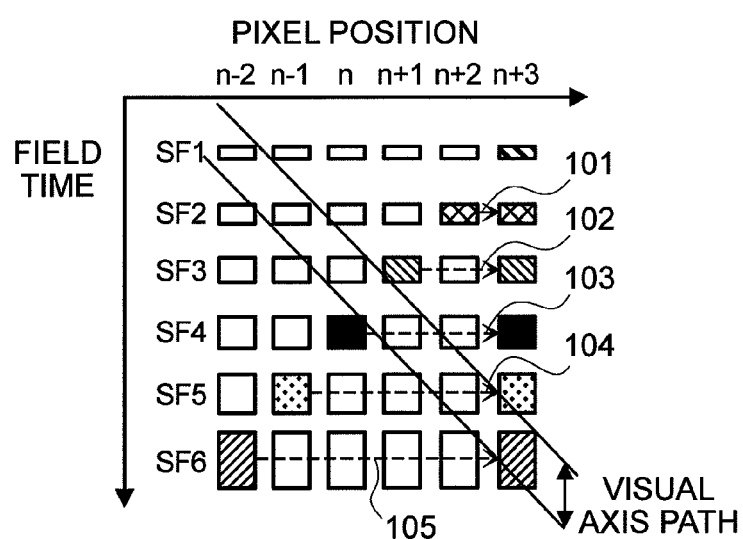
Figure 1C:
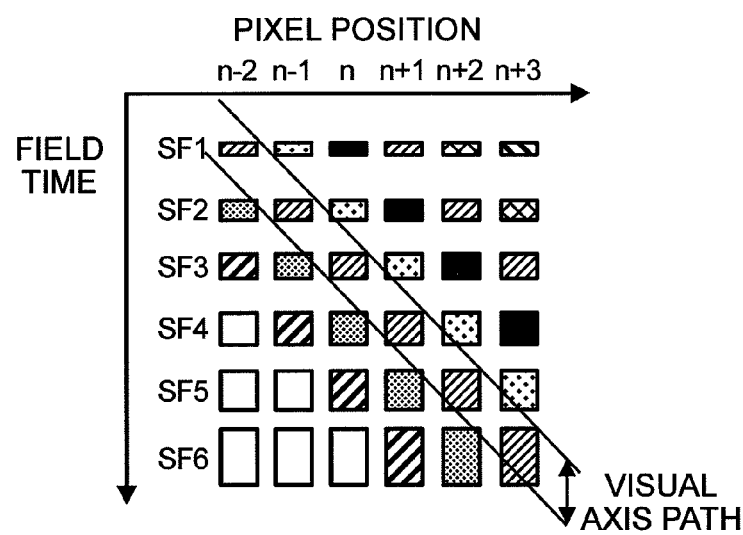

First of all, FIGS. 1(a) to 1(c) show the display data when the number "N" of sub-fields is six (6) while showing the horizontal positions of pixels on the horizontal axis and the time on the vertical axis thereof. In FIG. 1(a), consideration will be paid on the reconstruction of each sub-fields of the pixel (n+3).

Herein, in FIGS. 1(a) to 1(c), it is assumed that the pixel of a start point of a motion vector ending at the pixel (n+3), being the pixel of a target of the reconstruction, lies at the position "−6" in the horizontal direction, in the relative position upon the pixel (n+3). In this instance, the vector value of the said motion vector is "+6". Herein, when the distance between the respective sub-fields on the light-emission start time is an equal distance (hereinafter, being called "equal distance"), the acquired pixel position of each sub-field before the reconstruction can be obtained by the following equation (Eq. 1), upon basis of the pixel of the target of reconstruction, for example:

$$Xi = -V \times \frac{(i-1)}{N}$$ (Eq. 1)

Herein, "Xi" is the acquired vector of pixel position for each sub-field before reconstruction, upon basis of the pixel position of the target of reconstruction. Herein, "i" indicates a number of the sub-field to be conducted with the reconstruction thereon. Also, "V" indicates a vector value, and "N" indicates the number of sub-fields, which constructs "1 TV field". Herein, among motion vectors defined between a reconstruction target field and a field time-sequentially previous or prior to the target field, the motion vector value "V" to be used within the present embodiment is that of a motion vector, starting from the pixel of time-sequentially prior field and ending at the reconstruction target pixel in the reconstruction target field. In the example shown in the present figure, it is "+6" as was mentioned above. Within the reconstruction of each sub-field of the said reconstruction target pixel, the said motion vector is used.

However, in case where a result of calculating out the position vector is of accuracy of a decimal, a position vector of accuracy of an integer may be used, which can be obtained through a process, for example, rounding, cutting or rising it to an integer, etc. Or, it may be used as it is, i.e., the accuracy of a decimal. This is also same to all of the embodiments, which will be given below.

In the present embodiment, among the motion vectors defined between the reconstruction target field and the time-sequentially prior field to the target field, selection is made on the said motion vector starting from the pixel of the time-sequentially prior field and ending at the reconstruction target pixel (n+3) of the reconstruction target field, and calculation of the pixel position vector is conducted with using the equation 1, for each of the sub-fields, and thereby conducting the reconstruction of the sub-fields. Hereinafter, explanation will be made on this.

In an example shown in FIG. 1(b), as was mentioned above, the pixel at the starting point of the motion vector ending at the pixel (n+3), as the pixel of the target of reconstruction, locates at the position −6 in the horizontal direction, in the relative position based on the pixel (n+3), and the vector value of the said motion vector is +6. Herein, with using the equation (Eq. 1), it is possible to calculate out a pixel position vector Xi for the each sub-field. The pixel position vector Xi has: SF6 being −5, SF5 being −4, SF4 being −3, SF3 being −2, SF2 being −1, and SF1 being 0, respectively.

Accordingly, as is shown by an arrow 105 in FIG. 1(b), SF6 obtains light emission data for the sub-field from the pixel (n−2). Also, as is shown by an arrow 104, SF5 obtains the light emission data for the sub-field from the pixel (n−1). Also, as is shown by an arrow 103, SF4 obtains the light emission data for the sub-field from the pixel n. And also, as is shown by an arrow 102, SF3 obtains the light emission data for the sub-field from the pixel (n+1). Further, as is shown by an arrow 101, SF2 obtains the light emission data for the sub-field from the pixel (n+2). Also, SF1 is the light emission data for the sub-field of the pixel (n+3), as it is.

As was mentioned above, the light emission data is reconstructed for each of the sub-fields of the reconstruction target pixel (n+3). Also, for the pixels from (n−4) to (n+2), in the similar manner to the case of the pixel (n+3) mentioned above, the pixel position vector Xi is calculated with using the equation (Eq. 1), and it is possible to reconstruct each of the sub-fields of the pixels from (n−4) to (n+2), with using the sub-fields at the pixel positions obtained. In this instance, in case where every vector value of the motion vectors is same, i.e., +6, each ending at the respective pixel on the field of the reconstruction target, then the sub-fields after the reconstruction are as is shown in FIG. 1(*c*). In this instance, as a result thereof, a plural number of sub-fields located at the same pixel in the still picture (i.e., the sub-fields shown with the same pattern in FIG. 1) are aligned on the visual axis path, after reconstructing the each pixel.

In this instance, within the first embodiment, the difference of light emission starting time is fixed for each of the sub-fields. Herein, there is no parameter in (Eq. 1), relating to the light emission starting time and the light emission position (a time center) for the sub-field, there can be obtained an effect that the calculation process with such the reconstruction is less in an amount or volume of calculation.

Herein, further explanation will be given on the difference, hereinafter, in particular, between the conventional method and the display method according to the present invention. As was mentioned above, there is a case where the sub-fields are generated, not being set up like the sub-fields within an area or region 1310 indicated by frame lines shown in FIG. 13(*b*). In this case, according to the display method of the present embodiment, there is obtained a motion vector ending at the pixel of the reconstruction target, and then the reconstruction is made for each of the sub-fields. With this, it is possible to prevent the pixel from being generated, on which the sub-fields are not reset. This will be explained by referring to FIG. 13(*e*). Herein, FIG. 13(*d*) shows the initial condition for that shown in FIG. 13(*e*), and it is same to that shown in FIG. 13(*a*).

In the example shown in FIG. 13(*e*), it is assumed that any one of the pixels at the starting points of the motion vectors, each ending at one of the pixels from the pixel (n−5) to the pixel (n−1), among the pixels of the fields of reconstruction target, is located at a position of −5 in the horizontal direction, as the relative position upon basis of each pixel. In this instance, the vector value is +5, for any one among of those motion vectors. Also, it is assumed that any one of the pixels at the starting points of the motion vectors, each ending at one of the pixels from the pixel n to the pixel (n+5), is located at a position of −6 in the horizontal direction, as the relative position upon basis of each pixel. In this instance, the vector value is +6, for any motion vector among of those motion vectors. When calculating the position vector Xi for each of the sub-fields with using the (Eq. 1), at each reconstruction target pixel, with using this motion vector, it comes to be as follows. Thus, where the reconstruction target pixels are pixels from the pixel (n−5) to the pixel (n−1), then the position vector Xi has: SF6 being −4, SF5 being −3, SF4 being −2, SF3 being −1, SF2 being −1, and SF1 of 0, respectively. Also, where the reconstruction target pixels are pixels from the pixel n to the pixel (n+5), then the position vector Xi has: SF6 being −5, SF5 being −4, SF4 being −3, SF3 being −2, SF2 being −1, and SF1 being 0, respectively.

A result of the reconstruction with using each of those position vectors Xi is shown in FIG. 13(*e*). In this instance, also all of the sub-fields within the area 1320 enclosed by the frame lines are reset. Accordingly, as is shown in FIG. 13(*e*), it is possible to reset all of the sub-fields of all pixels, while maintaining the structures of the light emission sub-fields, upon which the visual axis path is considered.

Also, as was mentioned above, there is a case where the sub-field cannot be set within the triangle frame lines 1311, as is shown in FIG. 13(*c*). Also in this case, according to the display method of the present embodiment, there is obtained a motion vector ending at the pixel of the reconstruction target, so as to reset for the sub-fields for each. With this, it is possible to prevent the pixel from being generated, on which the sub-fields are not reset. This will be explained by referring to FIG. 13(*f*). For that shown in FIG. 13(*f*), the initial condition is as shown in FIG. 13(*d*).

In the example shown in FIG. 13(*f*), it is assumed that any one of the pixels at the starting points of the motion vectors, each ending at one of the pixels from the pixel (n−5) to the pixel (n−1), among the pixels of the fields of reconstruction target, is located at a position of 0 in the horizontal direction, as the relative position upon basis of each pixel. In this instance, the vector value is 0, for any one among of those motion vectors. Also, it is assumed that any one of the pixels at the starting points of the motion vectors, each ending at one of the pixels from the pixel n to the pixel (n+5), is located at a position of −6 in the horizontal direction, as the relative position upon basis of each pixel. In this instance, the vector value is +6, for any motion vector among of those motion vectors. When calculating the position vector Xi for each of the sub-fields with using the (Eq. 1), at each reconstruction target pixel, with using this motion vector, it comes to be as follows. Thus, where the reconstruction target pixels are pixels from the pixel (n−5) to the pixel (n−1), then the position vector Xi has SF6, SF5, SF4, SF3, SF2, and SF1, each being 0. Also, where the reconstruction target pixels are pixels from the pixel n to the pixel (n+5), then the position vector Xi has: SF6 being −5, SF5 being −4, SF4 being −3, SF3 being −2, SF2 being −1, and SF1 being 0, respectively.

A result of the reconstruction with using each of those position vectors Xi is shown in FIG. 13(*f*). In this instance, also all of the sub-fields within the area 1321 enclosed by the frame lines are reset. Accordingly, as is shown in FIG. 13(*f*), it is possible to reset all of the sub-fields of all pixels, while maintaining the structures of the light emission sub-fields, upon which the visual axis path is considered.

In this instance, with the method for setting the sub-fields, according to the first embodiment, all of the sub-fields of all pixels are reset, while positioning the light emission sub-fields by taking the visual axis path into the consideration. With this, it is possible to prevent the sub-fields from being not positioned, while suppressing the blur of motion picture or the dynamic false contour from generation thereof.

Figure 2:
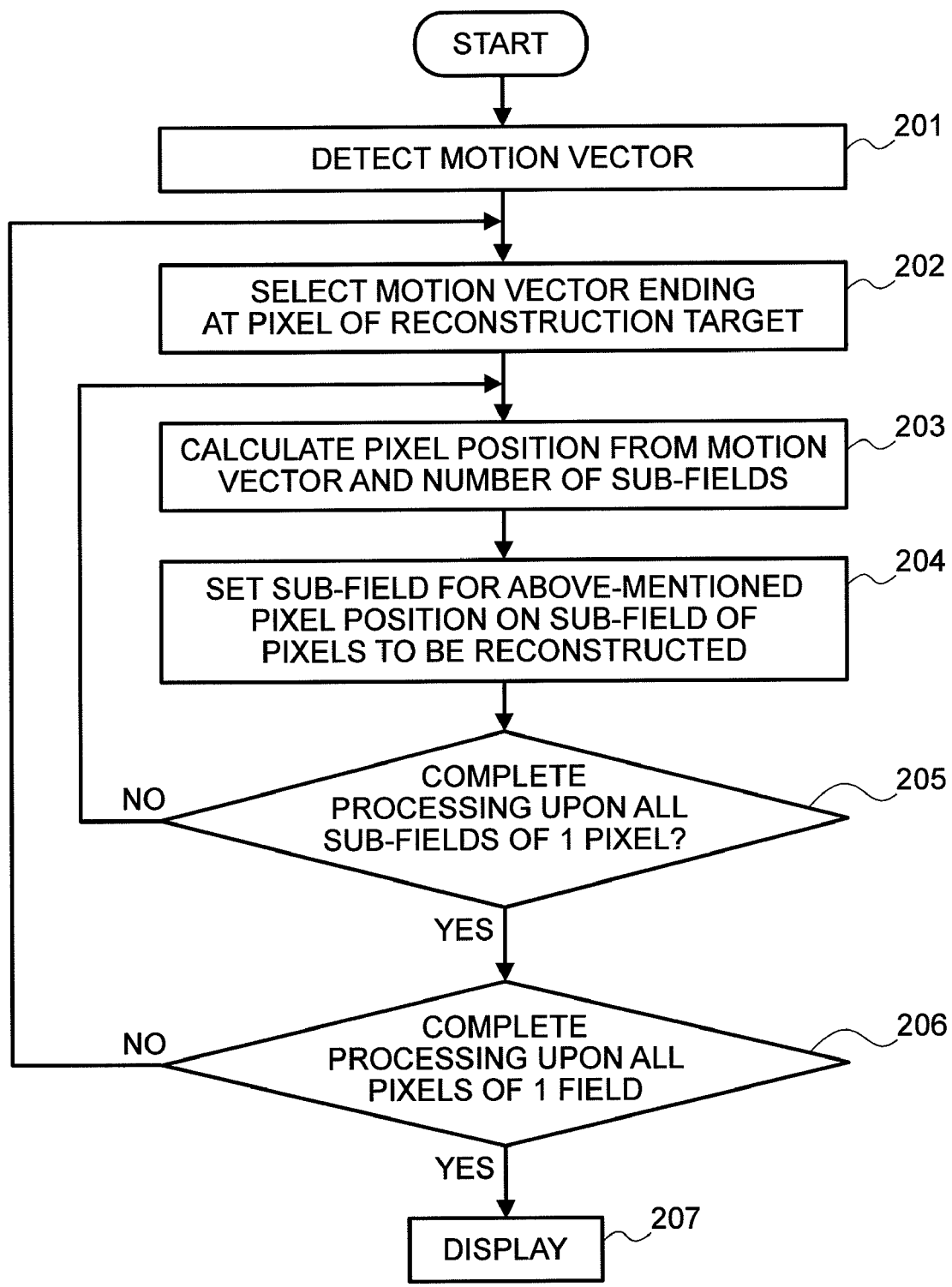
FIG. 2 is a view for explaining an example of flowchart of a displaying method, according to the embodiment of the present invention.

Next, steps of the above are shown by a flowchart shown in FIG. 2. First of all, in a step 201 is made comparison between the display data of a target field and the display data of the field, which is time-sequentially previous or prior to that target field, to detect the motion vector, starting from the time-sequentially previous or prior pixel and ending at the pixel of the target field, for each of the pixels of that target field. Next, in a step 202, selection is made on the motion vector ending at one pixel to be the target, among the motion vectors detected in the step 201. Next, in a step 203, for one sub-field of one pixel to be reset thereafter, the pixel position vector of the sub-field before the resetting, which can be obtained from the (Eq. 1), for example, with using the numerical orders or the numbers of the target sub-field and the motion vectors, which are selected in the step 202. Further, in a step 204, the light emission data is set for the sub-field having the same numerical order within the pixels indicted by the pixel position vector obtained, into the target sub-fields of the reconstruction pixels. Next, in a step 205, determination is made on whether the resetting is done or not for all of the sub-fields of that one pixel. Also, if the resetting is done for all of the sub-fields, then the process advances into a step 206. If not so, the processes in the steps 203 and 204 are conducted on the remaining sub-fields. Also, in a step 206, determination is made on whether the resetting of the sub-fields is done or not for all of the pixels of the target field. If the resetting of the sub-fields is completed for all of the pixels, then the process advances into a step 207. If not so, the processes in the steps 202 to 205 are conducted on the remaining pixels. In the step 207 is displayed the display data of the target field, which is obtained in the step 206.

Figure 14:
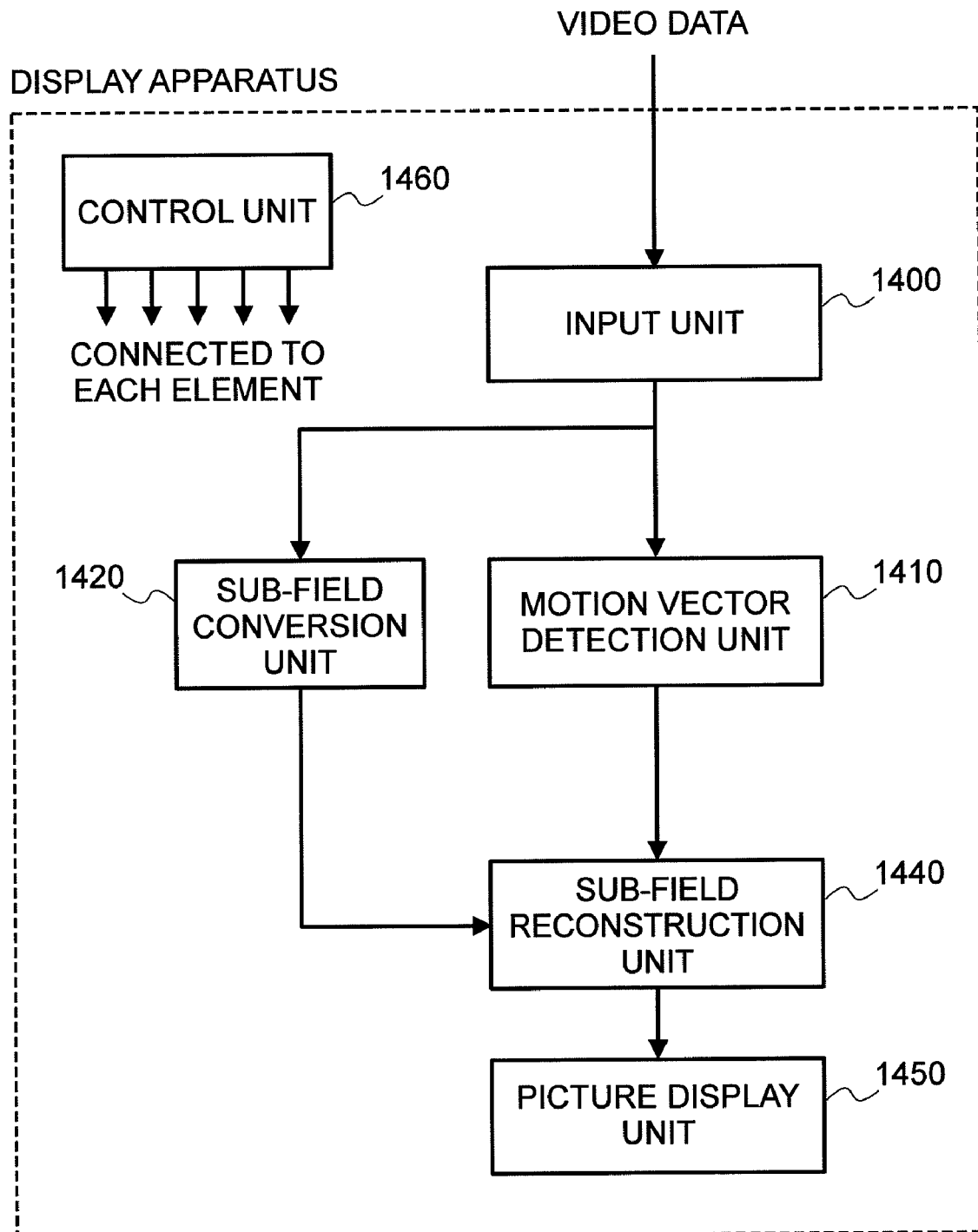
FIG. 14 is a block diagram for showing an example of a displaying apparatus, according to an embodiment of the present invention.

FIG. 14 is a block diagram for showing an example of the display apparatus, according to the first embodiment of the present invention. The display apparatus shown in FIG. 14 comprises, for example, an input unit 1400, a motion vector detection unit 1410, a sub-field conversion unit 1420, a sub-field reconstruction unit 1440, a video display unit 1450, and a control unit 1460.

Next, detailed explanation will be made on the operation of each unit. First of all, motion video data is inputted into the input unit 1400. For example, the input unit comprises a tuner for use of TV broadcast, video input terminals, network connector terminals, etc. And, it conducts the conversion process of the conventional technology, etc., upon the motion video data inputted, and also outputs the display data after the conversion process to the vector detection unit 1410. Next, in the motion vector detector unit 1410 is made comparison between the display data of the target field and the display data, being time-sequentially previous or prior to that target field, thereby detecting the motion vector ending at each of the pixels of the target field. The steps 201 and 202 shown in FIG. 2 are executed within the motion vector detector unit 1410, for example. In the sub-field conversion unit 1420, the display data is converted into sub-field data. In the sub-field reconstruction unit 1440 is calculated the pixel position of the sub-field before the reconstruction, for re-arranging the one sub-field of the pixels of the reconstruction target, according to the (Eq. 1), with using the motion vector ending at the reconstruction target pixel of the target field among the motion vectors detected within the said motion vector detector unit 1410, and the numerical order or the number of the sub-fields. Further, the sub-field reconstruction unit 1440 obtains the light emission data of the sub-field at that pixel position among the sub-field data, which is outputted by the sub-field conversion unit 1420. Thus, this executes the reconstruction, i.e., positioning the obtained light emission data onto the sub-fields of the reconstruction target. Repetition of this reconstructs the sub-fields for each one (1) pixel, and reconstructs the sub-field data, which is outputted by the sub-field conversion unit 1420. The steps 203, 204 and 205 are conducted within the sub-field reconstruction unit 1440, for example. Further, the video display unit 1450 has a plural number of pixels, each conducting the light-emission operation, such as, light-ON or light-OFF, etc. Herein, the video display unit 1450 controls light-ON or light-OFF of each pixel, upon basis of the sub-field data obtained within the above sub-field reconstruction unit 1440, and thereby displaying the picture thereon. The step 207 shown in FIG. 2 is executed within this video display unit 1450, for example. Also, in FIG. 14, the control unit 1460 is connected with each element of the display apparatus shown in FIG. 14. The operation of each element of the display apparatus shown in FIG. 14 may be autonomous, for each of the constituent elements thereof, as was mentioned above, or may operates upon an instruction from the control unit 1460, for example. Or, the steps 205, 206, etc., shown in FIG. 2, may be executed by the control unit 1460, for example.

With the display method of the first embodiment, which was explained in the above, it is possible to reconstruct one (1) target field to be one (1) new field. With repetition of those processes while changing the target field, it is possible to produces a plurality of new fields, so as to display the picture.

With the first embodiment explained in the above, it is possible to achieve the sub-field reconstruction while taking the visual axis path into the consideration, by means of the motion vector, and thereby to suppress the blur of motion picture or the dynamic false contour from generation thereof. It is also possible to prevent the sub-field from being generated, upon which no setup is made. Further, it is also possible to achieve those with reducing an amount of processing in the circuitry thereof.

<Embodiment 2>

Next, explanation will be made on a second embodiment of the present invention.

In the first embodiment, explanation was made on the case where the distance is equal and fixed between the light emission start times for each of the sub-fields. On the contrary to this, the second embodiment of the present invention shows a case of the display method for making the distance between those light emission start times variable, as is shown in FIG. 18(b), by taking the light emission period into the consideration thereof.

Herein, in FIG. 18(b), time distances T1, T2, T3, T4 and T5 between the light-emission start times between each of the sub-fields are variable depending upon the light-emission periods for each of the sub-fields, E1', E2', E3', E4 and E5', respectively. Herein, making variable depending on the light-emission periods E1', E2', E3', E4 and E5' means that, for example, the time distances T1, T2, T3, T4 and T5 are determined by the values of functions, etc., each using the light-emission periods, E1', E2', E3', E4 and E5', as variables, respectively. Therefore, differing from the first embodiment, the distances T1, T2, T3, T4 and T5 on the light-emission start times are not same in the time length thereof, between each of the sub-fields, which are used in the present embodiment.

Herein, explanation will be made on significance of changing the distance on that light-emission start time. First of all, for example, within a plasma display apparatus or the like, among the display apparatuses displaying the picture of one field through control of light-emission or non light-emission of each sub-field, there are cases where a process is conducted for making electric power constant. When conducting this process, the positional relationship of the light-emission start time for each of sub-fields is changed depending upon a display load ratio of an input video. Herein, the display load ratio is a parameter when adjusting a sustaining period depending on a parameter relating to screen brightness, such as, an averaged brightness on the screen, for example. Herein, it is possible to achieve the process for making the electric power constant, for example, by shortening the sustaining period shown in FIG. 10 when the display load is large, for example, or elongating that sustaining period when the display load is small. For that reason, the display method is conducted therein, for making the distance between the light-emission start times variable.

Herein, explanation will be made on an inclination of the direction of the visual axis when the display load is changed depending upon the averaged brightness on the screen, etc. First, the visual axis on the still picture does not move even if elapsing the sub-field period. Then, it stays on the same pixel. It is assumed that the inclination of the visual axis path is zero (0).

Herein, when the display load is large, for example, then the light-emission period for each of sub-fields is short. The display apparatus at this time emits lights, shifting the sequential order of each of the sub-fields, closely. With this, the light-emission start time for each of sub-fields becomes early within the period of 1 TV field. Accordingly, the inclination comes to be small in the direction of the visual axis.

On the other hand, when the display load is small, for example, the light-emission period for each of sub-fields becomes long. On the display apparatus mentioned above, the light-emission start time for each of sub-fields is delayed within the period of 1 TV field. Accordingly, the inclination comes to be large in the direction of the visual axis.

Herein, within the explanation that will be given below, explanation will be made, by taking an example, where the display load is large, and the sub-field emits the light early than the light-emission time for each of sub-fields at the equal distance, and also the inclination of the visual axis path becomes small.

Herein, for example, a plural number of tables, "light-emission start time (ms) for each SF at distance by taking the light-emission into consideration" shown in a Table 1, are prepared in advance, for each of levels of the averaged brightness. And, it is possible to obtain the distance of the light-emission position of the sub-field, which is changed depending on the display load ratio of the picture, but without delay thereof, by obtaining the averaged brightness level thereof, before displaying the picture. With this, it is possible to make the circuit scale small.

TABLE 1

| | Sub-fields | | | | | |
|---|---|---|---|---|---|---|
| | SF1 | SF2 | SF3 | SF4 | SF5 | SF6 |
| (1) Light-emission start time (ms) for each SF at equal distance | 1.0900 | 3.5905 | 6.0910 | 8.5915 | 11.0920 | 13.5925 |
| (2) Light-emission start time (ms) for each SF at distance by taking light-emission into consideration | 1.0900 | 3.3100 | 5.5500 | 7.9600 | 10.2700 | 12.7000 |

Herein, explanation will be made on the reconstruction of the sub-fields, in case where the light-emission start times for each of the sub-fields from the top of 1 field, with respect to the display time of 1 field (for example, 16.67 ms in case of 60 Hz picture), are as shown by (2) in the Table 1, as an example, by referring to FIGS. 3(a) to 3(c).

Figure 3A:
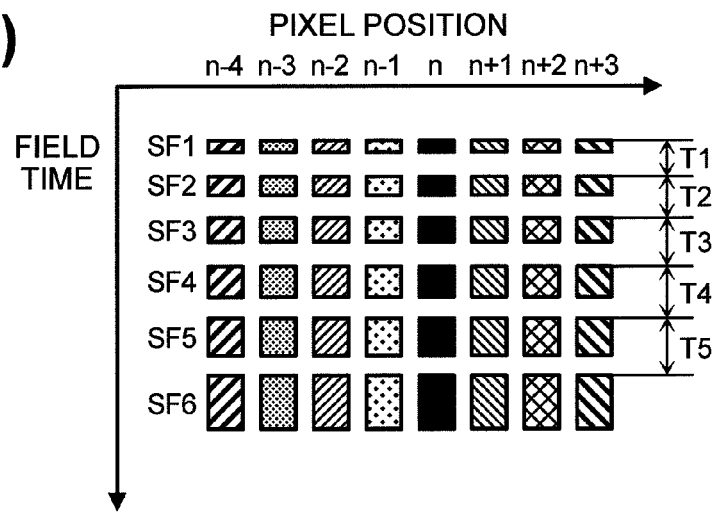
FIG. 3 is a view for explaining an example of a reconstructing method of sub-field, according to other embodiment of the present invention.
Figure 3B:
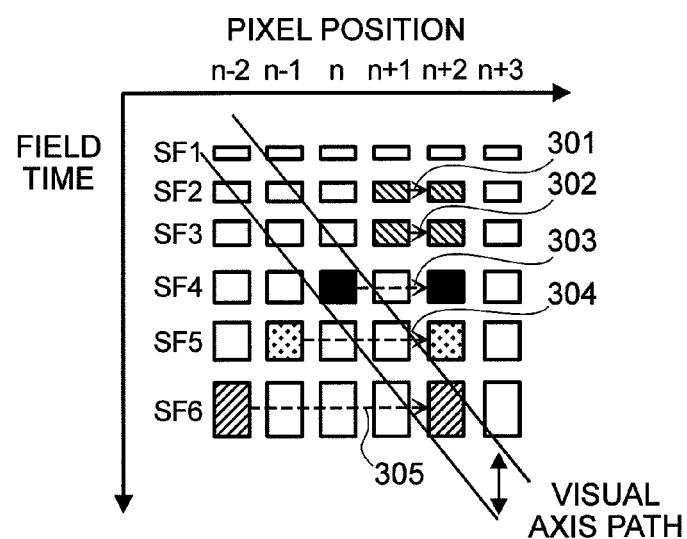
Figure 3C:
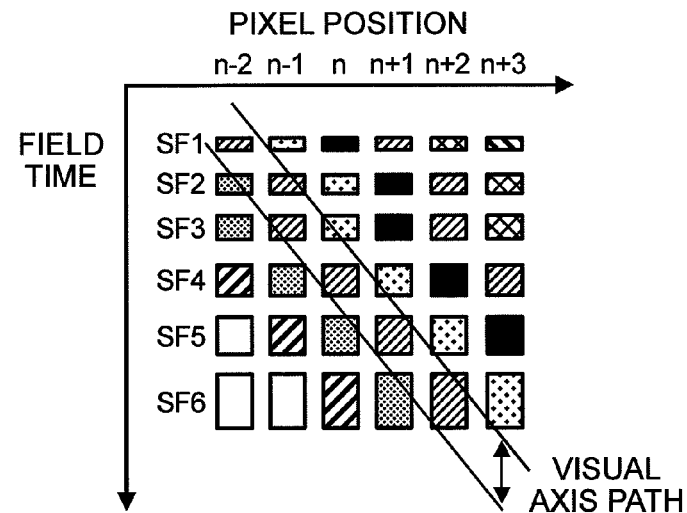

FIGS. 3(a) to 3(c) are views for explaining the reconstruction of each of the sub-fields of the pixel (N+2). The light-emission data for the sub-fields before resetting thereof is shown in FIG. 3(a).

Herein, in FIGS. 3(a) to 3(c), it is assumed that the pixel at the start point of the motion vector, ending at the pixel (n+2), i.e., a pixel of the reconstruction target, is located at the position −6 in the horizontal direction, as the relative position upon basis of the pixel (n+2). In this instance, the vector value of that motion vector is +6.

In this instance, within the example shown in FIGS. 3(a) to 3(c), it is the case of taking the distance of the light-emission into consideration, i.e., taking the time of the light-emission sub-field into the consideration, shown in (2) in the Table 1. Herein, within the present embodiment, the acquired pixel position vector for each of the sub-fields before the reconstruction is obtained by the following equation (Eq. 2), upon basis of the pixel of the reconstruction target, for example:

$$Xi = -V \times \frac{Si}{Tf} \quad \text{(Eq. 2)}$$

where, Xi is the acquired pixel position vector for each of the sub-fields before the reconstruction, upon basis of the pixel position of the reconstruction target. Herein, "i" indicates a numerical order (i.e., the number) of the sub-field, upon which the reconstruction will be made. Also, "V" indicates the motion vector value. The motion vector value "V" to be used in the present embodiment is that of the motion vector, starting from the pixel on that time-sequentially previous field and ending at the reconstruction target pixel within the reconstruction target field, among the motion vectors defined between the reconstruction target field and the time-sequentially previous field to that target field. In the reconstruction of each of the sub-fields of that reconstruction target pixel, that motion vector is used. Also, "Si" indicates the light-emission start time of "i"$^{th}$ SF, and for example, it is indicated in (2) in the Table 1. Further, "Tf" indicates the period of 1 TV field.

The light-emission parameters of each SF, which is contained in the (Eq. 2), is variable depending on the light-emission period for each of the sub-field within the same field. Then, with using said perimeter, it is possible to achieve the reconstruction by taking the light-emission period of the sub-field into the consideration thereof.

In the present embodiment, selection is made on the motion vector, starting from the pixel of that time-sequentially precious field and ending at the reconstruction target pixel (n+2) of the reconstruction target field, among the motion vectors defined between the reconstruction target field and the field time-sequentially previous to that target field, and calculation is made on the pixel position vector mentioned above, with using the (Eq. 2), thereby achieving the reconstruction of the sub-fields. Hereinafter, explanation will be made on this.

In the example shown in FIG. 3(b), as was mentioned above, the pixel at the end point of the motion vector, ending at the pixel (n+2), i.e., the pixel of the reconstruction target, is located at the position −6 in the horizontal direction, as the relative position upon basis of the pixel (n+2), and the vector value of that motion vector is +6. Herein, with using the (Eq. 2), it is possible to calculate the pixel position vector Xi for each of the sub-fields of the pixel (n+2). The pixel position vector Xi has: SF6 being −4, SF5 being −3, SF4 being −2, SF3 being −1, SF2 being −1, and SF1 being 0, respectively.

Accordingly, in this case, as is shown by an arrow 305 in FIG. 3(b), SF6 obtains the light-emission data for the sub-fields from the pixel (n−2). Also, as is shown by an arrow 304, SF5 obtains the light-emission data for the sub-fields from the pixel (n−1). Also, as is shown by an arrow 303, SF4 obtains the light-emission data for the sub-fields from the pixel n. Also, as is shown by an arrow 302, SF3 obtains the light-emission data for the sub-fields from the pixel (n+1). And, as is shown by an arrow 301, SF2 also obtains the light-emission data for the sub-fields from the pixel (n+1). And, SF1 obtains the light-emission data for the sub-fields from the original pixel (n+2). As was mentioned above, the pixel (n+2) is reconstructed.

As was mentioned above, the light-emission data for each of the sub-fields of the reconstruction target pixel (n+2) are reconstructed. Also, with other pixels, in the similar manner of the case of the pixel (n+2) mentioned above, it is possible to calculate the pixel position vector Xi with using the (Eq. 2), for each of the sub-fields of the reconstruction target pixel, and thereby reconstructing each of the sub-fields of each pixel, with the sub-fields of the pixel position obtained. In this instance, in case where any one of the pixel of the start position of the motion vector, ending at the respective pixels on the field of the reconstruction target, is located at the position −6 in the horizontal direction, as the relative position upon basis of the reconstruction target pixel, in the similar manner to that of the pixel (n+2) mentioned above, and the vector value thereof is +6, then the sub-fields after the reconstruction are as shown in FIG. 3(c). In this instance, as a result thereof, a plural number of sub-fields, which are positioned or disposed at the same pixel on the still picture (i.e., the sub-fields indicated with the same pattern in FIGS. 3(a) to 3(c)), are aligned on the visual axis path after the reconstruction of each pixel.

As in the present embodiment, if reconstructing the sub-fields with using the motion vector and the pixel position vector, which is obtained from the light-emission distance of the sub-fields, it is possible to align the plural number of sub-fields, which are positioned at the same pixel when being the still picture assumedly, on the visual axis path. In this instance, according to the present embodiment, since the sub-fields are reconstructed with using the motion vector and the light-emission distance as the parameters therein, then the light-emission patterns of the sub-fields are aligned on the visual axis path when a user views the picture, more preferably, even if the light-emission distance between the sub-fields is variable. With this, it is possible to suppress the blur of motion picture or the dynamic false contour from generation thereof.

Also, within the second embodiment, the motion vector is obtained, which ends at the pixel of the reconstruction target, in the similar manner to that of the first embodiment, and thereby conducting the reconstruction for each of the sub-fields of that pixel. With this, it is possible to prevent the pixel from being generated, upon which no sub-field is reconstructed. This effect is similar to that of the first embodiment.

In this instance, with using a table relating to the light-emission position for each sub-field, corresponding to the averaged brightness level, it is possible to reduce an amount or volume of processes relating to calculation for the distance between the light-emission positions of the sub-fields depending on the display load ratio of the picture, etc. With this, it is possible to lessen the calculation amount or volume on calculation process in relation to that reconstruction.

Figure 4:
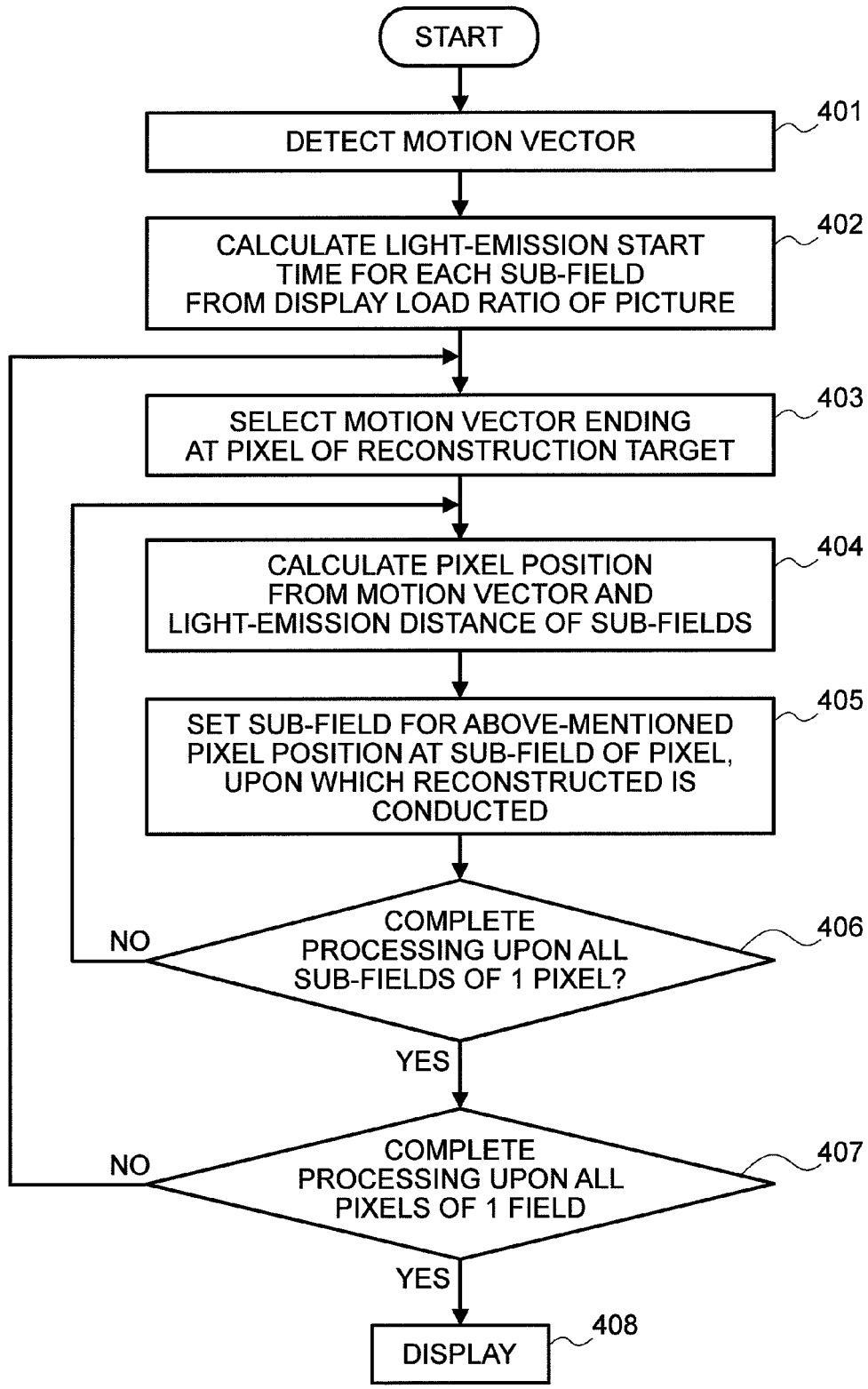
FIG. 4 is a view for explaining an example of flowchart of a displaying method, according to the other embodiment of the present invention.

Next, the operation steps of the present embodiment will be shown in the flowchart shown in FIG. 4. Firstly, in a step 401 is made comparison between the display data of the target field and the display data of the field, being time-sequentially previous to that target field, and thereby detecting the motion vector for each of the pixels of that target field, starting from the pixel on that time-sequentially previous field and ending at the pixel on that target field. Next, in a step 402 is calculated the light-emission start time for each of the sub-field, changing upon the display load of the display data, with using the table relating to the light-emission position of each of the sub-fields corresponding to the averaged brightness level. Next, in a step 403 is selected the motion vector ending at one pixel of the target, among the motion vectors detected in the step 401. Further, in a step 404 is obtained the acquired pixel position vector before resetting, with using the (Eq. 2) and also using the motion vector selected in the step 403, the 1 TV field period, and the light-emission start time of the target sub-field as the parameters. Further, in a step 405, the light-emission data for the sub-fields, having the same number within the pixels indicated by the pixel position vector obtained, is set to the target sub-fields of the pixel, to which the reconstruction will be made. Next, in a step 406 is made determination on whether the reset is made or not, upon all of the sub-fields of that one pixel. And, if the reset is made on all of the sub-fields, the process advances to a step 407. If not so, then the processes in the steps 404 and 405 are conducted on the remaining sub-fields. Also, in the step 407 is made determination on whether the reset of the sub-fields is completed or not, upon all of the pixels of the target field. If the reset of the sub-fields is completed on all the pixels, then the process advances to a step 408. If not so, the processes in the steps 403 to 406 are conducted on the remaining pixels. In the step 408 is displayed the display data of the target field, which is obtained in the step 407.

Figure 15:
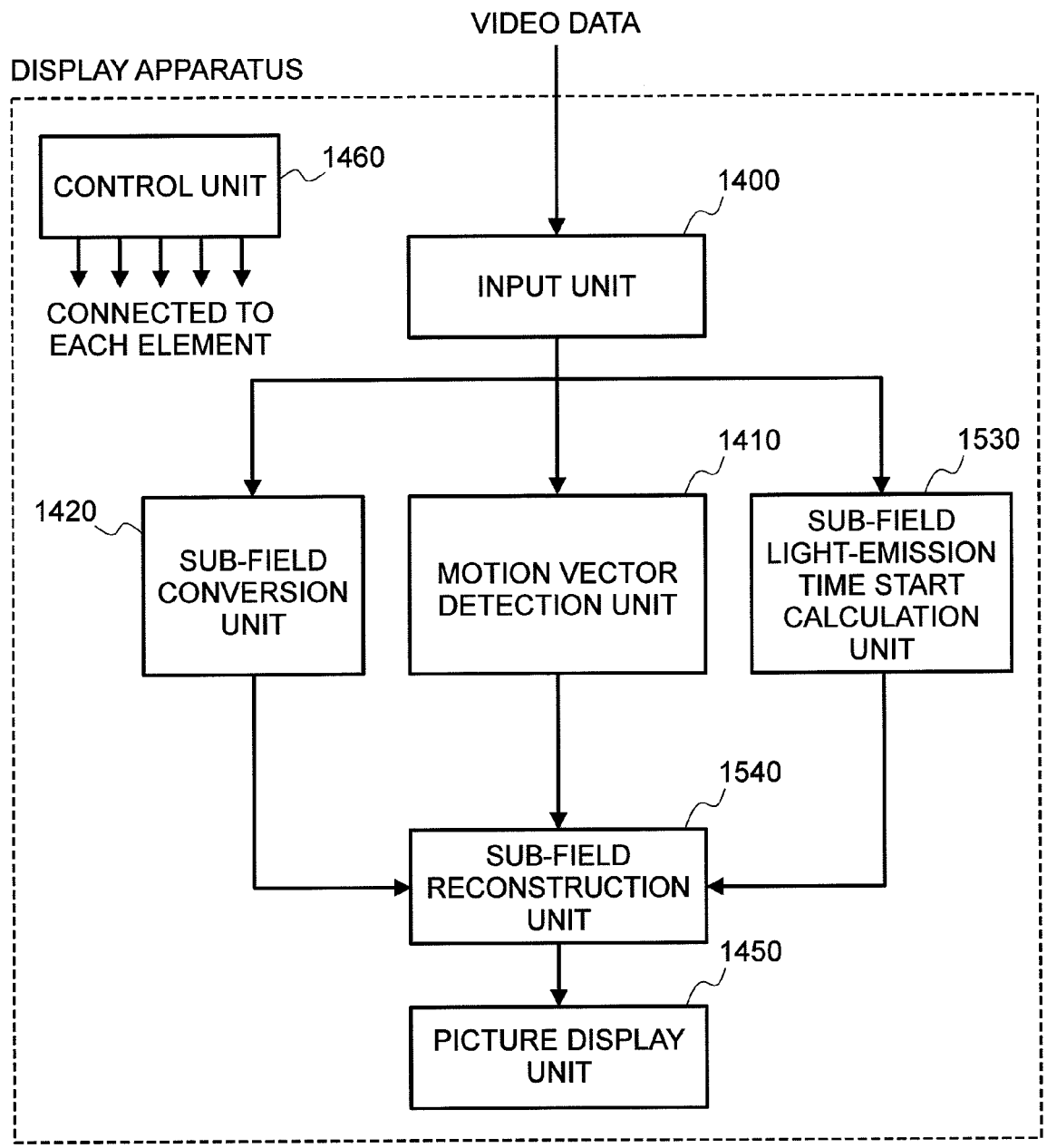
FIG. 15 is a block diagram for showing an example of a displaying apparatus, according to other embodiment of the present invention.

FIG. 15 is a block diagram for showing an example of the display apparatus, according to the second embodiment of the present invention. The display apparatus shown in FIG. 15 comprises, for example, an input unit 1400, a motion vector detection unit 1410, a sub-field conversion unit 1420, a sub-field light-emission time calculation unit 1530, a sub-field reconstruction unit 1540, a video display unit 1450, and a control unit 1460.

Next, detailed explanation will be made on the operation of each unit. First of all, motion video data is inputted into the input unit 1400. For example, the input unit comprises a tuner for use of TV broadcast, video input terminals, network connector terminals, etc. And, it conducts the conversion process of the conventional technology, etc., upon the motion video data inputted, and it also outputs the display data after the conversion process to the vector detection unit 1410. Next, in the motion vector detector unit 1410 is made comparison between the display data of the target field and the display data, being time-sequentially previous to that target field, thereby detecting the motion vector ending at each of the pixels of the target field. The steps 401 and 403 shown in FIG. 4 are executed within the motion vector detector unit 1410, for example. In the sub-field conversion unit 1420, the display data is converted into sub-field data. Herein, in the sub-field light-emission time calculation unit 1530 is obtained the light-emission start time for each of the sub-fields, changing depending on the display load ratio of the picture, for example. The step 402 shown in FIG. 4 is executed within the sub-field light-emission time calculation unit 1530. In the sub-field reconstruction unit 1540 is calculated the pixel position of the sub-field before the reconstruction, for re-arranging the one sub-field of the pixels of the reconstruction target, according to the (Eq. 2), with using the motion vector ending at the reconstruction target pixel of the target field among the motion vectors detected within the said motion vector detector unit 1410, the light-emission time for each sub-field obtained within the sub-field light-emission time calculation unit 1530, and the 1 TV field period, etc., as the parameters. Further, the sub-field reconstruction unit 1540 obtains the light emission data of the sub-field at that pixel position among the sub-field data, which is outputted by the sub-field conversion unit 1420. The light-emission data obtained is re-arranged for the sub-fields of the reconstruction target. Repetition of this reconstructs the sub-fields for each one (1) pixel, and reconstructs the sub-field data, which is outputted by the sub-field conversion unit 1420. Those steps 404, 405 and 406 shown in FIG. 4 are conducted within the sub-field reconstruction unit 1540, for example. Next, the video display unit 1450 has a plural number of pixels, each conducting the light-emission operation, such as, light-ON or light-OFF, etc. Herein, the video display unit 1450 controls light-ON or light-OFF of each pixel, upon basis of the sub-field data obtained within the above sub-field reconstruction unit 1540, and thereby displaying the picture thereon. The step 408 shown in FIG. 4 is executed within this video display unit 1450, for example. Also, in FIG. 15, the control unit 1460 is connected with each element of the display apparatus shown in FIG. 15. The operation of each element of the display apparatus shown in FIG. 15 may be autonomous, for each of the constituent elements thereof, as was mentioned above, or may operates upon an instruction from the control unit 1460, for example. Or, the steps 406, 407, etc., shown in FIG. 4, may be executed by the control unit 1460, for example.

With the display method of the second embodiment, which was explained in the above, it is possible to reconstruct one (1) target field to be one (1) new field. With repetition of those processes while changing the target field, it is possible to produces a plurality of new fields, so as to display the picture.

With the second embodiment explained in the above, it is possible to achieve the sub-field reconstruction, so that the visual axis of the user can suitably trace upon the light-emitting sub-fields, even within the display method, in which the light-emission time for each sub-field is variable depending on the display load ratio of the picture, etc. With this, it is possible to suppress the blur of motion picture or the dynamic false contour from generation thereof, suitably. And, it is also possible to prevent the sub-field from being generated, upon which no setup is made. Also, those can be achieved with the less amount or volume of calculation.

In the example mentioned above, the explanation was given on the case where the sub-field emits the lights earlier than the light-emission start time for each sub-field at the equal distance. However, the similar effect can be obtained by conducting the reconstruction of the sub-fields with using the (Eq. 2), even in case where the sub-fields emits the lights later than the light-emission time for each sub-field at the equal distance, i.e., the inclination of the visual axis path is large.

<Embodiment 3>

Next, explanation will be made on a third embodiment of the present invention. In the display method according to the third embodiment of the present invention, the distance is fixed to be equal, between the light-emission start times for each sub-field, as was in the first embodiment.

Explanation will be made about a motion vector F to be used in the display method, according to the third embodiment of the present invention, by referring to FIG. 5. This motion vector F is the vector for indicating a manner, i.e., from which pixel of the previous field A is moved an intermediate pixel B, locating between a present field C and the previous field A. Thus, in FIG. 5, it is the motion vector, ending at the pixel "b" of the intermediate field B and starting from the pixel "a" of the previous field A.

Herein, as the method for calculating the said vector F or for producing the intermediate field, form the plural number of fields within the input motion video; the conventional method may be used, which is described in the following reference document, in particular, in FIG. 3 thereof, etc.

(Reference Document 1) Japanese Patent Laying-Open No. 2006-310985

Figure 5:
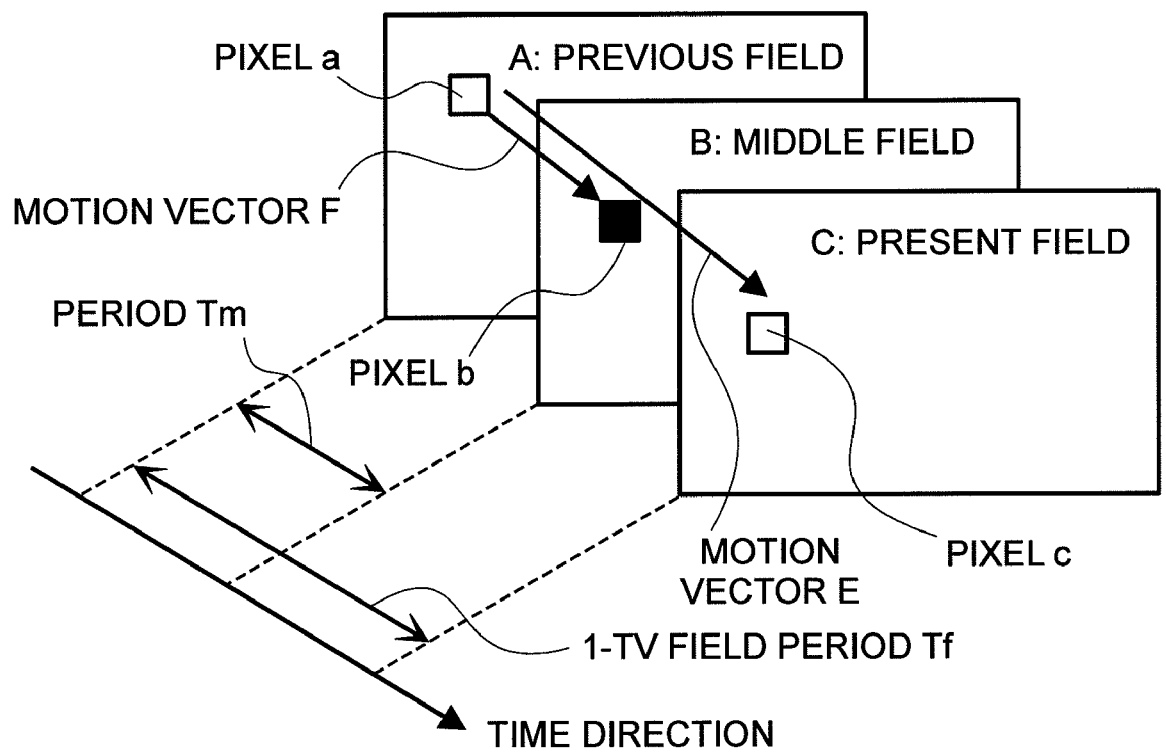
FIG. 5 is a view for explaining an example of an intermediate field and a motion vector "F", according to the embodiment of the present invention.

For example, in FIG. 5, it is possible to obtain the motion vector E from the pixel "a" to the pixel "c", with presumption of an amount of motion from correlation of the picture pattern between the present field C and the precious field A. Assuming that the time-sequential distance (i.e., a period) is Tm, between the previous field A and the intermediate field B, and the time-sequential distance (the period) is Tf, between the previous field A and the present field C, then the time-sequential distance (the period) is Tf-Tm between the intermediate field B and the present field C. In this instance, the motion vector F can be obtained by the following equation (Eq. 3), corresponding to the moving amount from the pixel "a" to the pixel "b":

$$Vf = V \times Tm/Tf \qquad \text{(Eq. 3)}$$

Where, Vf is the vector value of the motion vector F, and V is the vector value of the motion vector E, respectively. For example, in case where Tm is a half period of Tf, and also the vector value V of the motion vector E is +4, the vector value Vf of the motion vector F is +2. However, the motion vector F can be obtained, for example, from the (Eq. 3), but without producing the pixel of the intermediate field B.

Also, in FIG. 5, it is possible to output the pixel "b" of the intermediate field B at the position indicated by the motion vector F, with obtaining a function value having a pixel value of both pixels as a variable, such as, an averaged value of the pixel "a" of the previous field A and the pixel "c" of the present field C, or a weighted average by taking the distance up to the intermediate field into the consideration thereof, for example. In the similar manner, it is also possible to produce each of the pixels of the intermediate field, with using the motion vector E from each pixel of the previous field A to each pixel of the present field C.

However, though using the motion vector F mentioned above when reconstructing the sub-fields in any case, in the present embodiment, but any one of the following three (3) may be applied, as the target field, upon which the reconstruction of subfields will be conducted:

A first method is that of using the intermediate field B, which is produced in the manner as was mentioned above, to be the target field of the sub-field reconstruction. In this instance, the relationship between the target field and the motion vector F is as follows. Thus, the sub-field reconstruction is conducted upon the target field, i.e., the intermediate field B positioned between two (2) fields, which are contained in the video signal (i.e., the previous field A and the present field C). Herein. Between said pertinent two (2) pieces of fields, the motion vector is calculated as the motion vector F, starting from the pixel of the previous field A, i.e., the time-sequentially previous field, and ending at the pixel of the intermediate field B mentioned above. With using the corresponding motion vector F, the sub-fields are reconstructed for the intermediate field B, i.e., the target field. In this instance, the first method is the best or the most suitable method, from a viewpoint of the principle thereof, because the motion vector F to be used in the reconstruction ends at the pixel of the intermediate field B.

A second method is that of using the previous field A as the target field. In this instance, the relationship between the target field and the motion vector F is as follows. Thus, the sub-field reconstruction is conducted upon the previous field A, being the time-sequentially previous one, as the target field, between two (2) pieces of fields contained within the video signal (i.e., the previous field A and the present field C). Next, the motion vector F is calculated with using the (Eq. 3), for example. Also, reconstruction is made on the sub-fields of the previous field A, i.e., the target field, with using that motion vector F. Herein, with the second method, the previous field A, being the target field, is a field in the vicinity of the intermediate field B. Therefore, this reconstruction with diverting the motion vector F enables to obtain an equivalent to that of the first embodiment, as the motion picture after the reconstruction. Further, with the second method, there is no necessity of using the value of the pixel of the intermediate field B. Accordingly, there can be obtain an effect, i.e., it is not necessary to produce each pixel of the intermediate field, and also enables to reduce the calculation amount or volume thereof.

The third method is that of applying the present field C mentioned above to be the target field. In this instance, the relationship between the target field and the motion vector is as follows. Thus, the sub-field reconstruction is conducted upon the present field C, being time-sequentially rear or posterior one, as the target field, between two (2) pieces of fields contained within the video signal (the previous field A and the present field C). Next, the motion vector F is calculated with using the (Eq. 3), for example. Also, reconstruction is made on the sub-fields of the present field C, i.e., as the target field, with using that motion vector F. Herein, with the third method, the present field C, being the target field, is a field in the vicinity of the intermediate field B, being same to that in the second method. Therefore, this reconstruction with diverting the motion vector F enables to obtain an equivalent to that of the first method, as the motion picture after the reconstruction. Further, with the third method, there is no necessity of using the value of the pixel of the intermediate field B. Accordingly, there can be obtain an effect, i.e., it is not necessary to produce each pixel of the intermediate field, and also enables to reduce the calculation amount or volume thereof.

As was mentioned above, any one of the following three (3) may be applied, as the target field, upon which the reconstruction of sub-fields will be conducted. Therefore, though being called only "target field" in the explanation of the present embodiment given below, but this "target field" may be any one of the previous field A shown in FIG. 5, the intermediate field B, and the present field C.

Figure 6A:
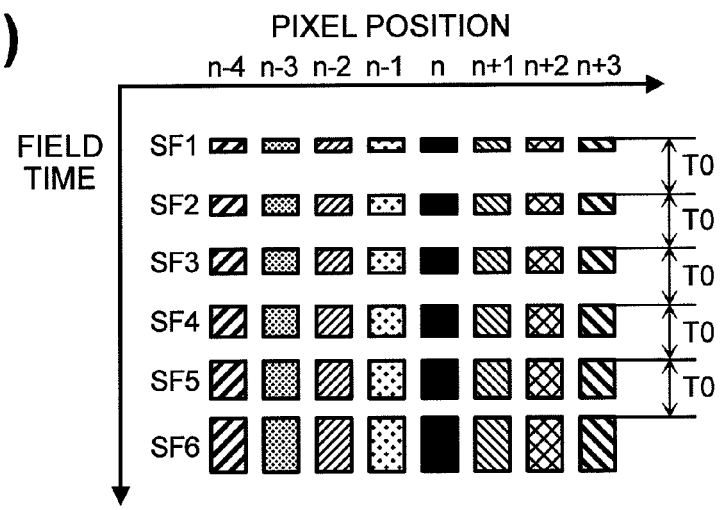
FIG. 6 is a view for explaining an example of a reconstructing method of sub-field, according to further other embodiment of the present invention.
Figure 6B:
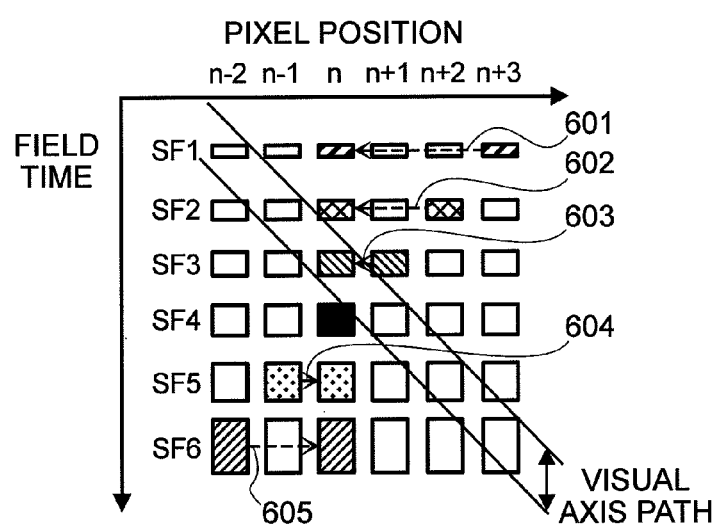

Herein, explanation will be given on the reconstruction of sub-fields, according to the present embodiment, by referring to FIG. 6(*a*). This FIG. 6(*a*) is a view for showing the display data of the sub-field of the target field, wherein the horizontal axis depicts the horizontal position of the pixel and the vertical axis depicts the time, and in particular, when the sub-field number N is six (6). Herein, consideration will be paid upon the reconstruction of each of the sub-fields of the target field.

First, in the present embodiment, in FIG. 5, with the motion vector ending at the pixel of the present field C and passing through the pixel of the intermediated field B and starting from the pixel of the previous field A, it is assumed that the relative position of the pixel at the said start point thereof is −6 in the horizontal direction, upon basis the pixel at the said end point thereof. Also, in this instance, a vector value of the motion vector E is +6. Herein, it is assumed that an intermediate field B in FIG. 5 lies at the center of the period of 1 TV field between the previous field A and the present field C. In this instance, with a motion vector F ending at the pixel "n" of the intermediate field B and starting from the pixel of the previous field A, the relative position of the start point of that motion vector F is −3 in the horizontal direction, upon basis of the pixel "n" at the end point of that motion vector F. Also, the vector value of this motion vector F, in this instance, is +3.

Further, the distances on the light-emission start time, between each of the sub-fields in the present embodiment, is also equal, similar to that in the first embodiment.

Herein, the pixel position for each of the subfields to be obtained can be obtained by the following equation (Eq. 4), upon basis of the pixel of the reconstruction target, for example:

$$Xi = -Vf \times \frac{(i-1)-(N \times \alpha)}{N \times \alpha}$$ (Eq. 4)

Herein, Xi is the pixel position vector of each of the sub-fields before the reconstruction to be obtained, upon basis of the pixel position of the reconstruction target. Herein, "i" indicates the number of the sub-field, upon which the reconstruction will be made. Also, Vf indicates the vector value of the motion vector F, and N indicates the number of the sub-fields for building up the 1 TV field. Herein, as the vector value Vf of the motion vector to be applied in the present embodiment, between the previous field A and the intermediate field B, the motion vector F is used, starting from the pixel of that previous field A and ending at the pixel of the reconstruction target in the intermediate field B. Within the reconstruction of each of the sub-fields of the reconstruction target pixel is used that motion vector F.

Herein, "α" in the (Eq. 4) is a ratio of the period "Tm" from a head of the 1 TV field to the above-mentioned intermediate field B to the period of 1 TV field "Tf", shown in FIG. 5, and can be defined by the following equation (Eq. 5):

$$\alpha = Tm/Tf$$ (Eq. 5)

Accordingly, "α" is 0.5 when the intermediate field B lies at the center of the period of 1 TV field between the above-mentioned previous field A and the above-mentioned present field C.

In the present embodiment, selection is made on the motion vector F, starting from the pixel of the previous field A and ending at the reconstruction target pixel "n" of the intermediate sub-field B, from among the vectors defined between the above-mentioned previous field A and the above-mentioned intermediate field B, and calculation is made of the pixel position vector mentioned above with using the (Eq. 4) for each of the sub-fields; thereby conducting the reconstruction of the sub-fields. Hereinafter, explanation will be made on this.

In an example shown in FIG. 6(*b*), as was mentioned previously, the pixel at the starting point of the motion vector F, ending at the pixel "n", i.e., being the pixel of the reconstruction target, is located at the position of relative position −3 in the horizontal direction, upon basis of the pixel "n", and the vector value of that motion vector F is +3. Herein, with using the (Eq. 4), it is possible to calculate out the pixel position vector Xi for each of the sub-fields of the pixel "n" of the target field. Each of the pixel position vector Xi is: SF6 −2, SF5 −1, SF4 0, SF3 +1, SF2 +2, SF1 +3, respectively.

Accordingly, as is shown by an arrow 605 in FIG. 6(*b*), SF6 obtains the light-emission data for the sub-field from the pixel (n−2). Also, as shown by an arrow 604, SF5 obtains the light-emission data for the sub-field from the pixel (n−1). Also, SF4 obtains the light-emission data for the sub-field from the original pixel "n". Also, as shown by an arrow 603, SF3 obtains the light-emission data for the sub-field from the pixel (n+1). Also, as shown by an arrow 602, SF2 obtains the light-emission data for the sub-field from the pixel (n+2). Also, as shown by an arrow 601, SF1 obtains the light-emission data for the sub-field from the pixel (n+3). As was mentioned above, reconstruction is conducted upon the light-emission data of the sub-fields of the pixel "n".

Figure 6C:
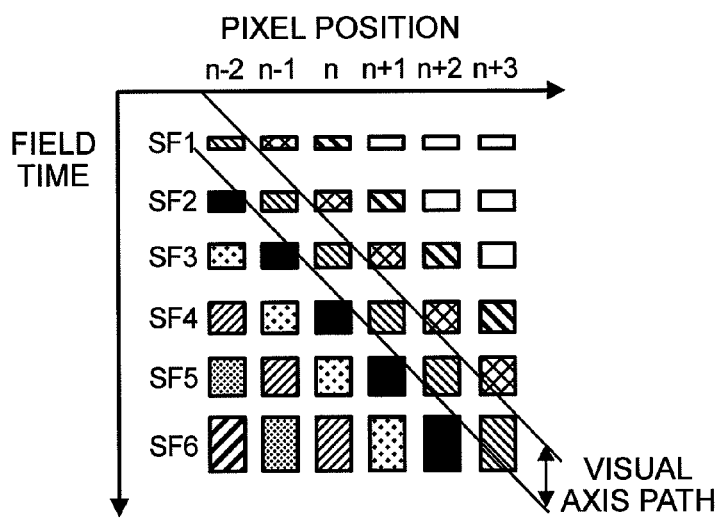

Also, in case where the pixel of the starting point of the motion vector F, ending at other pixel of the intermediate field B mentioned above, is located at the position of relative position −3, in the horizontal direction upon basis of the reconstruction target pixel, similar to the pixel "n" mentioned above, and where anyone of the motion vectors has the vector value +3, it is possible to calculate out the pixel position vector Xi for each of the sub-fields of the reconstruction target pixel, with using the (Eq. 4), and with the sub-fields at the pixel positions obtained, to reconstruct each of the sub-fields of other pixel, similar to the pixel "n" mentioned above. In this instance, the sub-fields after the reconstruction are as shown in FIG. 6(c). In this instance, as a result thereof, a plural number of sub-fields, which are disposed on the same pixel in the still picture (i.e., the sub-fields shown by the same pattern, in FIGS. 6(a) to 6(c)), are aligned on the visual axis path, within the target field after the reconstruction.

Therefore, according to the third embodiment, also similar to that of the first embodiment, it is possible to align the plural number of sub-fields on the visual axis path, which would be disposed at the same pixel when assuming to be the still picture. Herein, according to the third embodiment, but differing from the first embodiment, it is possible to reduce the movement amount of the light-emission data for the sub-fields, within the reconstruction thereof. Namely, in the first embodiment shown in FIG. 1(b) and the third embodiment shown in FIG. 6(b), though both of those shows the condition where the vector value on the period of 1 TV field is +6, for example, but according to the first embodiment shown in FIG. 1(b), the greatest movement amount of the light-emission data for the sub-fields is at five (5) pixels indicated by an arrow 105. On the contrary to this, in the third embodiment shown in FIG. 6(b), for example, the greatest movement amount of the light-emission data for the sub-fields is at three (3) pixels indicated by an arrow 601. Therefore, with the method of the reconstruction with using the (Eq. 4), it is possible to reduce the movement amount of the light-emission data for the sub-fields, much more. In this manner, it is possible to reduce the movement amount, upon the reconstruction of the light-emission data for the sub-fields. With this, it is possible to suppress fluctuation of the picture, etc., and thereby obtaining an effect of achieving the picture being natural much more.

Also, in this instance, since the difference between the light-emission time is fixed for each of the sub-fields, there is no parameter in the (Eq. 4), in relation to the light-emission start time and the light-emission position (the center on the time) of the sub-field, etc., and therefore, there can be achieved an effect that the calculation process for that reconstruction comes to be small in the calculation amount thereof.

Figure 7:
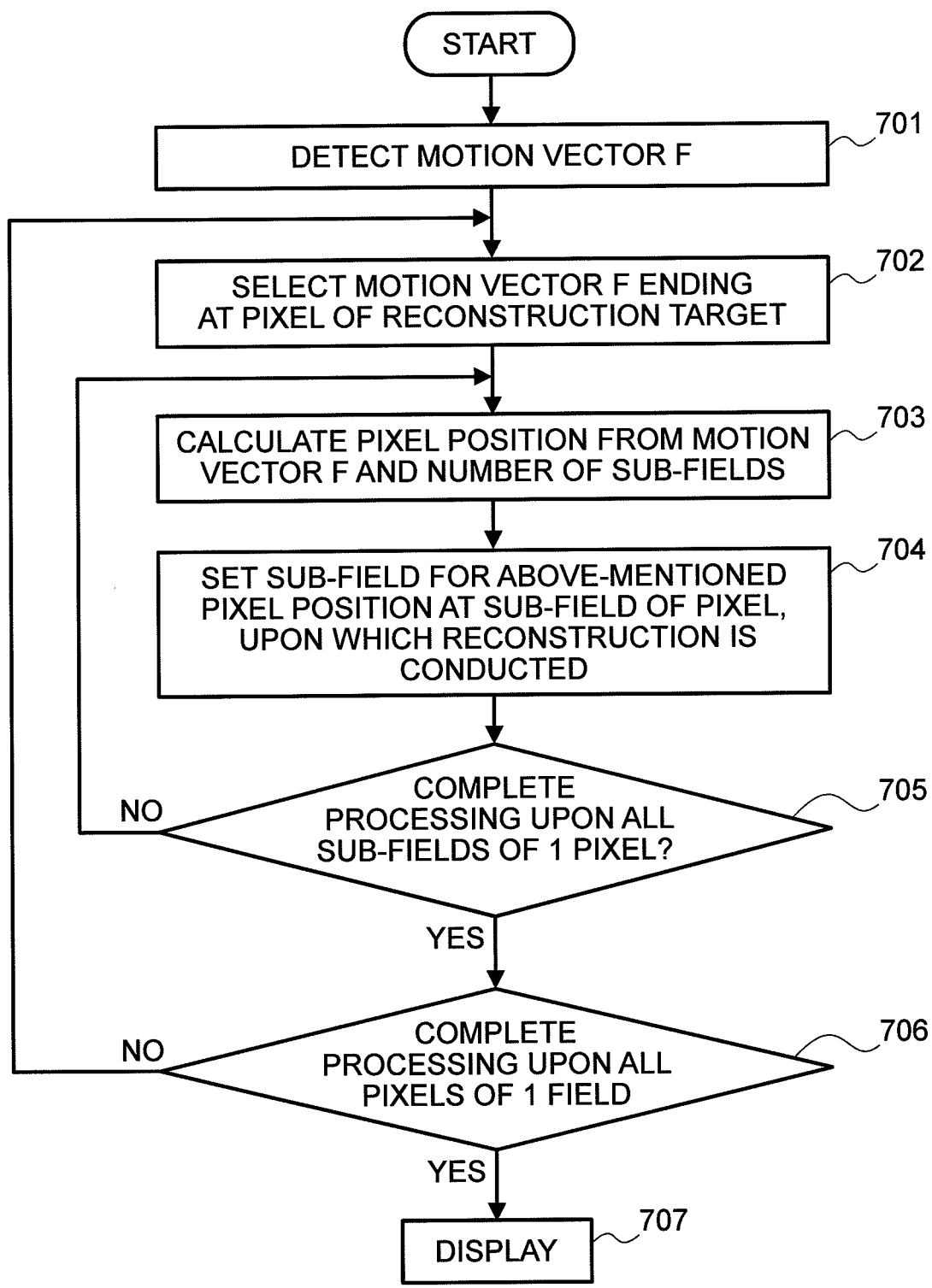
FIG. 7 is a view for explaining an example of flowchart of a displaying method, according to the further other embodiment of the present invention.

Next, the steps of the above will be shown in the flowchart shown in FIG. 7. First, in a step 701, as was explained by referring to FIGS. 5(a) to 5(c), detection is made on the motion vector F, ending at the pixel of the intermediate field B and starting from the pixel of the previous field A, for each of the pixels the intermediate field B mentioned above. Next, in a step 702 is selected the motion vector F ending at one pixel to be the target, among the motion vectors detected in the step 701. Next, in a step 703 is obtained the pixel position vector of the sub-fields before the re-setting to be obtained, from the (Eq. 4), for example, with using the motion vector F selected in the step 702 and the number of the target sub-field and also the "α" mentioned above, for one sub-field of one pixel of the target field, upon which the reconstruction will be conducted from now. Next, in a step 704 is set up the light-emission data of the sub-field, which has the same number within the pixel indicated by the pixel position vector obtained, to the target sub-field of the reconstruction pixel of the target field. Next, in a step 705 is determined on whether the resetting is made or not upon all of the sub-fields of the said one pixel. If the resetting is made on all of the sub-fields, the process advances into a step 706. Otherwise, the processes in the steps 703 and 704 are conducted upon the remaining sub-fields. Next, in the step 706 is determined on whether the resetting of the sub-fields is completed or not upon all of the pixels of the target field. If the resetting of the sub-fields is completed upon all of the pixels, then the process advances into a step 707. Otherwise, the processes from 702 to 705 are conducted upon the remaining pixels. In the step 707 is displayed the display data of the target field obtained in the step 706.

Figure 16:
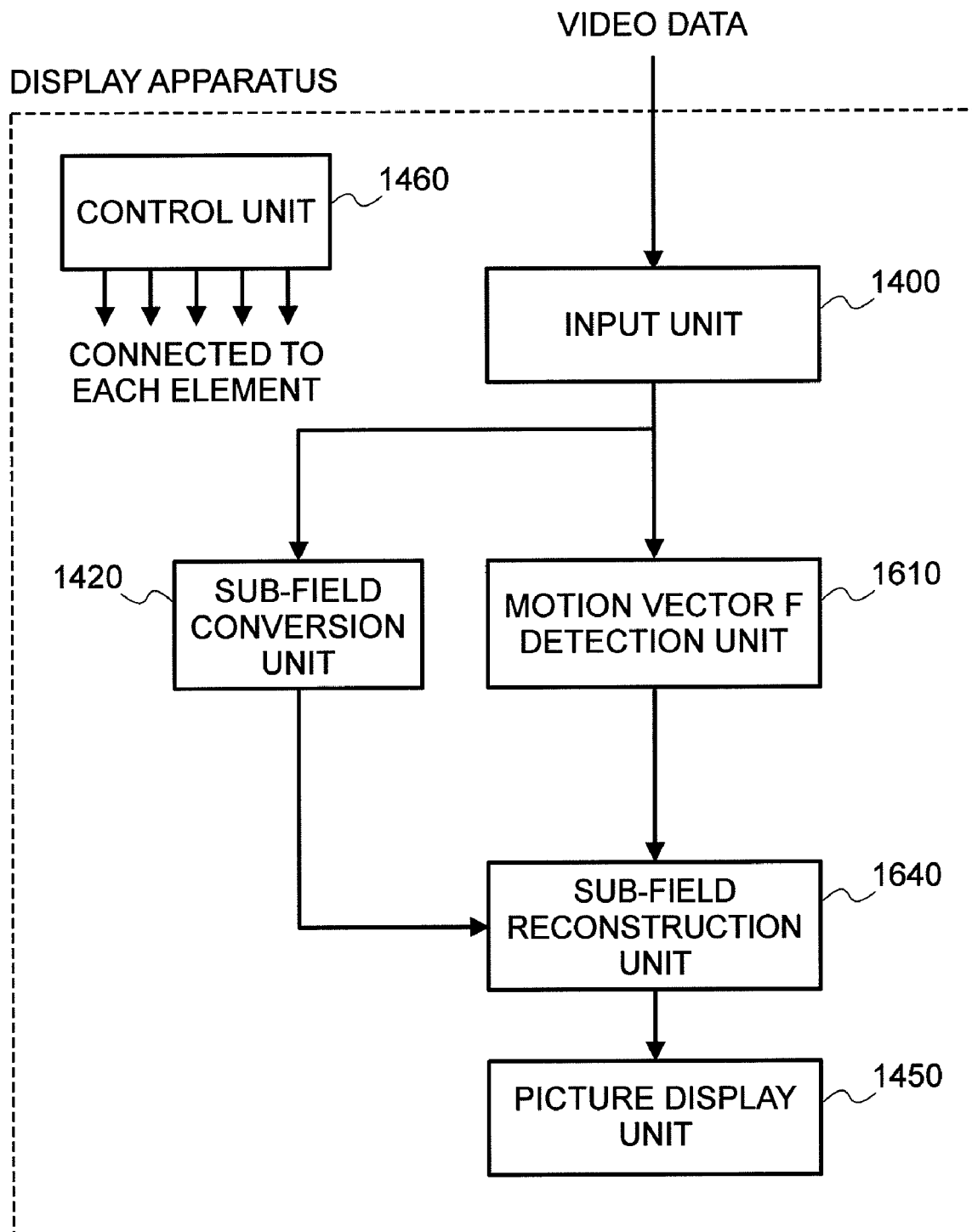
FIG. 16 is a block diagram for showing an example of a displaying apparatus, according to further other embodiment of the present invention.

FIG. 16 is a block diagram for showing an example of the display apparatus according to the third embodiment of the present invention. The display apparatus shown in FIG. 16 has an input unit 1400, a motion vector F detection unit 1610, a sub-field conversion unit 1420, a sub-field reconstruction unit 1640, a picture display unit 1450, and a control unit 1460.

First of all, into the input unit 1400 is inputted motion video data. For example, the input unit comprises a tuner for use of TV broadcast, video input terminals, network connector terminals, etc. And, it conducts the conversion process of the conventional technology, etc., upon the motion video data inputted, and it also outputs the display data after the conversion process to the motion vector F detection unit 1610. In the sub-field conversion unit 1420, the display data is converted into the sub-field data. In the motion vector F detection unit 1610, as was mentioned above by referring to FIG. 5, detection is made on the motion vector F, starting from the pixel of the previous field A mentioned above, for each of the pixels of the intermediate field B mentioned above. Further, the motion vector, starting from the pixel of that previous field A and ending at one pixel of that intermediate field B, is detected as the motion vector F. Thus, the steps 701 and 702 shown in FIG. 7 are executed within the motion vector F detection unit 1610. In the sub-field reconstruction unit 1640, calculation is made on the pixel positions of the sub-fields before the reconstruction, for re-arranging the sub-fields of the reconstruction target, in accordance with the (Eq. 4), using the motion vector F detected within the above-mentioned motion vector F detection unit 1610, the number of the target sub-fields and the above-mentioned "α" as the parameters. Herein, calculation of "α" mentioned above may be conducted within the sub-field reconstruction unit 1640, or may be calculated within control unit 1460, obtaining the 1 TV field period and the time from the head of the 1 TV field of the intermediate field from the memory, which memorizes them therein, in advance. Further, the sub-field reconstruction unit 1640 obtains the light-emission data for the sub-fields at the above-mentioned pixel positions of the sub-field data, which are outputted by the sub-field conversion unit 1420. And, it re-arranges the obtained light-emission data to the sub-fields of the reconstruction target. With repetition of this, the sub-fields are reconstructed for each one (1) of the pixels, and the sub-field data of the target field is produced, newly. The steps 703, 704 and 705 shown in FIG. 7 are executed with the sub-field reconstruction unit 1640, for example. The picture display unit 1450 has a plural number of pixels for conducting the light-emission operation, such as, light-ON and light-OFF, etc. Herein, the picture display unit 1450 controls the light-ON or the light-OFF of each of the pixels, upon basis of the sub-field data, which is obtained in the sub-field reconstruction unit 1640 mentioned above, and thereby displaying the picture thereon. The step 707 shown in FIG. 7 is executed within the picture display unit 1450, for example. Also, in FIG. 16, the control unit 1460 is connected with each of elements of the display apparatus shown in FIG. 16. Operation of each of the elements of the display apparatus shown in FIG. 16 may be autonomous one of the each element, as was mentioned above, or may be operated upon an instruction of the control unit 1460, for example. Also, the steps 705 and 706 shown in FIG. 7 may be conducted within the control unit 1460, for example.

With the display method of the third embodiment, which was explained in the above, it is possible to reconstruct one (1) target field, and thereby producing one (1) new field. With repetition of this while changing the target field, it is possible to produce a plural number of new fields, and thereby displaying the picture.

With the third embodiment explained in the above, it is possible to achieve the sub-field reconstruction by taking the visual axis path by the motion vector into the consideration thereof, and thereby enabling to suppress the blur of motion picture or the dynamic false contour from generation thereof. And, it is also possible to prevent the sub-field from being generated, upon which no setup is made. Also, it is possible to reduce an amount of movement of the sub-field, when conducting the reconstruction of this sub-field. With this, it is possible to suppress flickering or the like of the picture, and there can be obtained an effect of obtaining the picture being natural much more. Further, it is possible to achieve those, together with reducing the volume or amount of processes within those circuits.

<Embodiment 4>

Next, explanation will be made on a fourth embodiment of the present invention.

In the fourth embodiment of the present invention, in regard to the display method according to the second embodiment of the present invention, wherein the distance of that light-emission start time is variable by taking the light-emission period into the consideration, there is adopted the method of reconstruction of the sub-fields, according to the third embodiment of the present invention.

Herein, the explanation that will be given below is made on the case where, being similar to that of the second embodiment, the display load is large, i.e., the sub-fields emit lights earlier than the light-emission start time for each of the sub-fields at the equal distance, and where an inclination of the visual axis path comes to be small, as an example.

Also, being similar to that of the third embodiment, as the target field of the sub-fields reconstruction may be used any one of the three (3) methods, which are shown in the third embodiment. Therefore, though it is explained only by "target field" in the explanation of the present embodiment given below, but this "target field" may be any one of the previous field A, the intermediate field B and the present field C shown in FIG. 5.

Figure 8A:
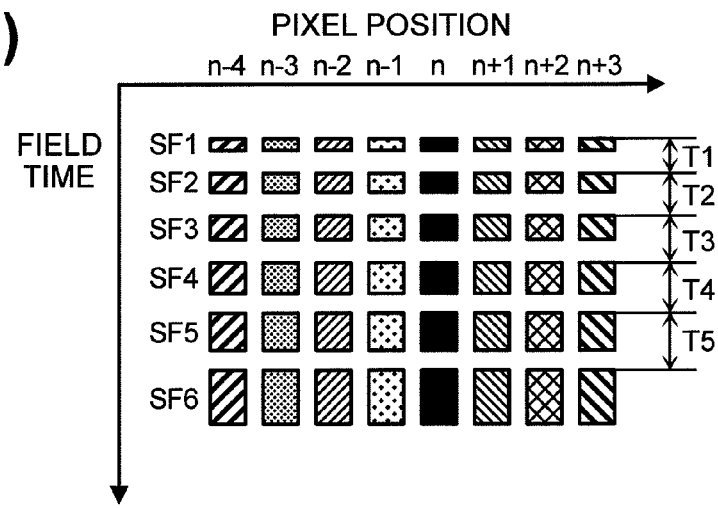
FIG. 8 is a view for explaining an example of a reconstructing method of sub-field, according to further other embodiment of the present invention.
Figure 8B:
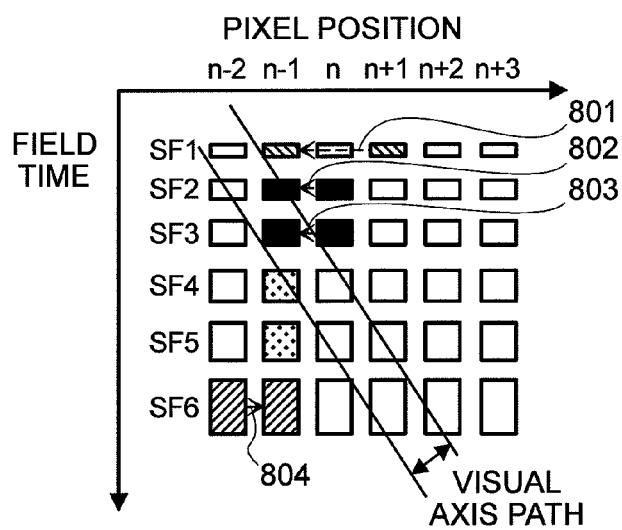
Figure 8C:
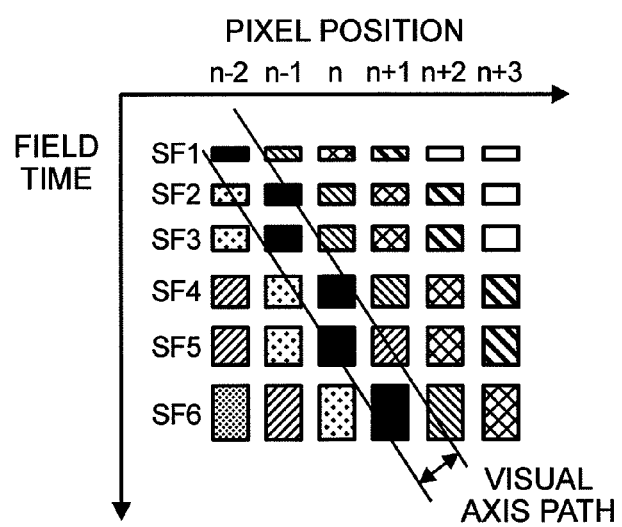

By referring to FIGS. 8(a) to 8(c), explanation will be made on an example of the reconstruction of the sub-fields of the target field, according to the present embodiment. FIGS. 8(a) to 8(c) show the display data in case where the number of sub-fields is 6, with showing the pixels on the horizontal axis and time on the vertical axis thereof. Herein, the present embodiment is applying the display method therein, of making the distance of that light-emission start time variable by taking the light-emission period into the consideration, similar to that of the second embodiment. Herein, in the present figure, it is assumed that the light-emission start time for each of the sub-fields from the head of 1 field, with respect to the display period of 1 field (for example, 16.67 ms in case of the picture of 60 Hz), is as shown in Table 1 (2), being same to that of the second embodiment.

Herein, in those FIGS. 8(a) to 8(c), consideration is made upon the reconstruction for each of the sub-fields of the pixel (n−1) of the target field.

First of all, according to the present embodiment, it is assumed that, in FIG. 5, with the motion vector starting from the pixel of the previous field A, passing through the pixel (n−1) of the intermediate field B, and ending at the pixel of the present field C, the relative position of the pixel at that starting point is −6 in the horizontal direction upon basis of the pixel of that ending point. Also, in this instance, the vector value of the motion vector E is +6. Herein, it is assumed that the intermediate field B is located at the position of the center of 1 TV field period between the previous field A and the present field C. In this instance, with the motion vector F ending at the pixel (n−1) of the intermediate field B and starting from the pixel of the previous field A, the relative position of the starting point of that motion vector F is −3 in the horizontal direction, upon basis of the pixel (n−1) at the ending point of that motion vector F. Also, in this instance, the vector value of the motion vector F is +3.

Next, the pixel position, for each of the sub-fields before the reconstruction to be obtained, is obtained by the following equation (Eq. 6), upon basis of the pixel of the reconstruction target, for example.

$$Xi = -Vf \times \frac{Si - (Tf \times \alpha)}{Tf \times \alpha}$$ (Eq. 6)

Herein, the definition for each parameter is same to that of each of the equations to be used in the other embodiments mentioned above.

In the present embodiment, among the motion vectors starting from the pixel of the above-mentioned previous field A and ending at the pixel of the above-mentioned intermediate field B, selection is made on the motion vector F ending at the reconstruction target pixel (n−1), and calculation is made on the pixel position vector mentioned above with using the (Eq. 6) for each of the sub-fields of the pixel (n−1) of the target field; thereby executing the reconstruction of the sub-fields. Hereinafter, explanation will be made on this.

In an example shown in FIG. 8(b), as was mentioned above, the pixel at the starting point of the motion vector F, which ends at the pixel (n−1), i.e., the pixel of the reconstruction target, is located at the position −3 in the horizontal direction, on the relative position upon basis of the pixel (n−1), and the vector value of that motion vector F is +3. Herein, with using the (Eq. 6), it is possible to calculate the pixel position vector Xi for each of the sub-fields of the pixel (n−1) of the target field. The pixel position vector Xi is: SF6 −1, SF5 0, SF 4 0, SF3 +1, SF2 +1, and SF1 +2, respectively.

Accordingly, as is shown by an arrow 804 in FIG. 8(b), SF6 obtains the light-emission data for the sub-field from the pixel (n−2). Also, SF5 and SF4 obtain the light-emission data from the original pixel (n−1). Also, as is shown by an arrow 803, SF3 obtains the light-emission data for the sub-field from the pixel "n". Also, as is shown by an arrow 802, SF2 obtains the light-emission data for the sub-field from the pixel "n". And, as is shown by an arrow 801, SF1 obtains the light-emission data for the sub-field from the pixel (n+1).

Also, the pixel at the starting point of the motion vector F, which ends at other pixel of the intermediate field B, is located at the position −3 in the horizontal direction, as the relative position upon basis of the reconstruction target pixel, being same to that of the pixel (n−1) mentioned above, and in case where the vector value of all of the motion vector F is +3, the pixel position vector Xi is calculated out, with using the (Eq. 6), for each of the sub-fields of the reconstruction target pixel of the target field, being similar to the pixel (n−1) mentioned above, and with an aid of the sub-fields of the pixel position obtained, it is possible to re-arrange each of the sub-fields of the other pixel. In this instance, the sub-fields after the reconstruction are as shown in FIG. 8(c). In this instance, as a result thereof, the plural number of sub-fields, which are disposed on the same pixel on the still picture (i.e., the sub-fields shown by the same pattern in FIGS. 8(*a*) to 8(*c*)), are aligned on the visual axis path in the target field after the reconstruction thereof.

Therefore, with the fourth embodiment, in the similar manner to that of the other embodiments, it is possible to align the plural number of sub-fields, to be aligned on the same pixel when assuming that they are on the still picture, on the visual axis path. In this instance, according to the present embodiment, since the sub-fields are reconstructed with using the motion vector and the distance between the light emissions of the sub-fields as the parameters, in the similar manner to that in the second embodiment, the light-emission patterns of the sub-fields are aligned on the visual axis path when the user looks at the picture, suitably, even in the case where the light-emission distance of the sub-fields are variable. With this, it is possible to suppress the blur of motion picture or the dynamic false contour from generation thereof.

Also, with the present embodiment, in the similar manner to that of the third embodiment, it is possible to reduce an amount of movement of the light-emission data between the sub-fields, when conducting the reconstruction, in particular, when reconstructing the light-emission data of the sub-fields. With this, there can be achieved an effect of obtaining the picture being natural much more.

Figure 9:
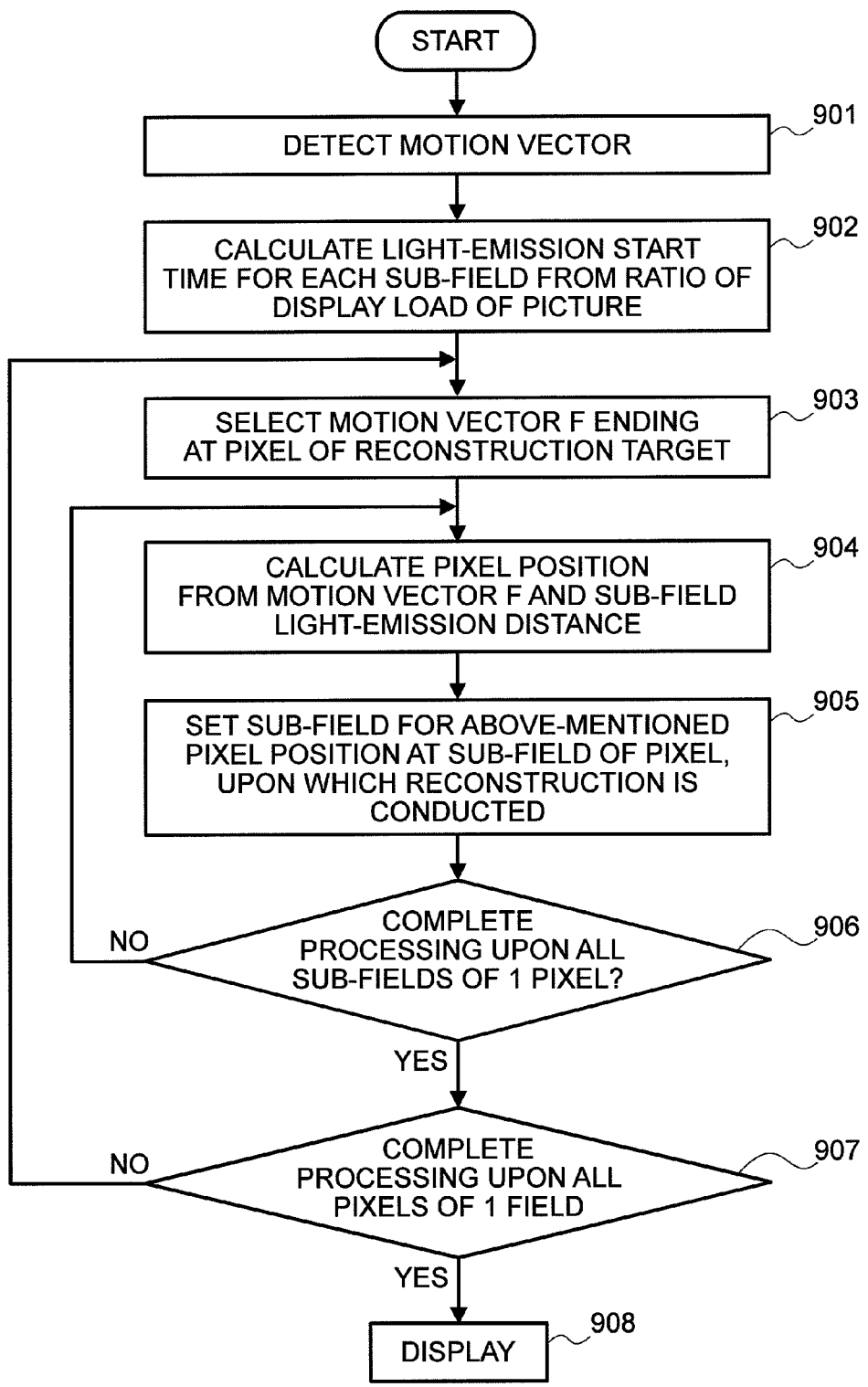
FIG. 9 is a view for explaining an example of flowchart of a displaying method, according to the further other embodiment of the present invention.

The steps of this will be shown, by referring to the flowchart shown in FIG. 9. First of all, in a step 901 is detected the motion vector F for each of the pixels of the intermediate field B mentioned above, as is in the step 701 shown in FIG. 7. Next, in a step 902, the light-emission start time for each of the sub-fields is calculated, as is in the step 402 shown in FIG. 4. Next, in a step 903 is selected the motion vector F, ending at one of the pixel to be the targets, among the motion vectors detected in the step 901. Herein, in a step 904, the pixel position vector of the sub-fields before the resetting, to be obtained, from the (Eq. 6), for example, with using the motion vector F mentioned above, the light-emission start time of the target sub-fields for 1 TV field period, and the "α" mentioned above. Next, in a step 905, within the target field, the light-emission data for the sub-field having the same number within the pixels, which are indicated by the obtained pixel position vector before the resetting, is set into the target sub-fields on the pixels at the target of reconstruction. Next, in steps 906 and 907 are executed the determination process and the loop process, as in the steps 705 and 706 shown in FIG. 7. And, also in a step 908 is displayed the display data of the target field obtained in the step 907 mentioned above.

Figure 17:
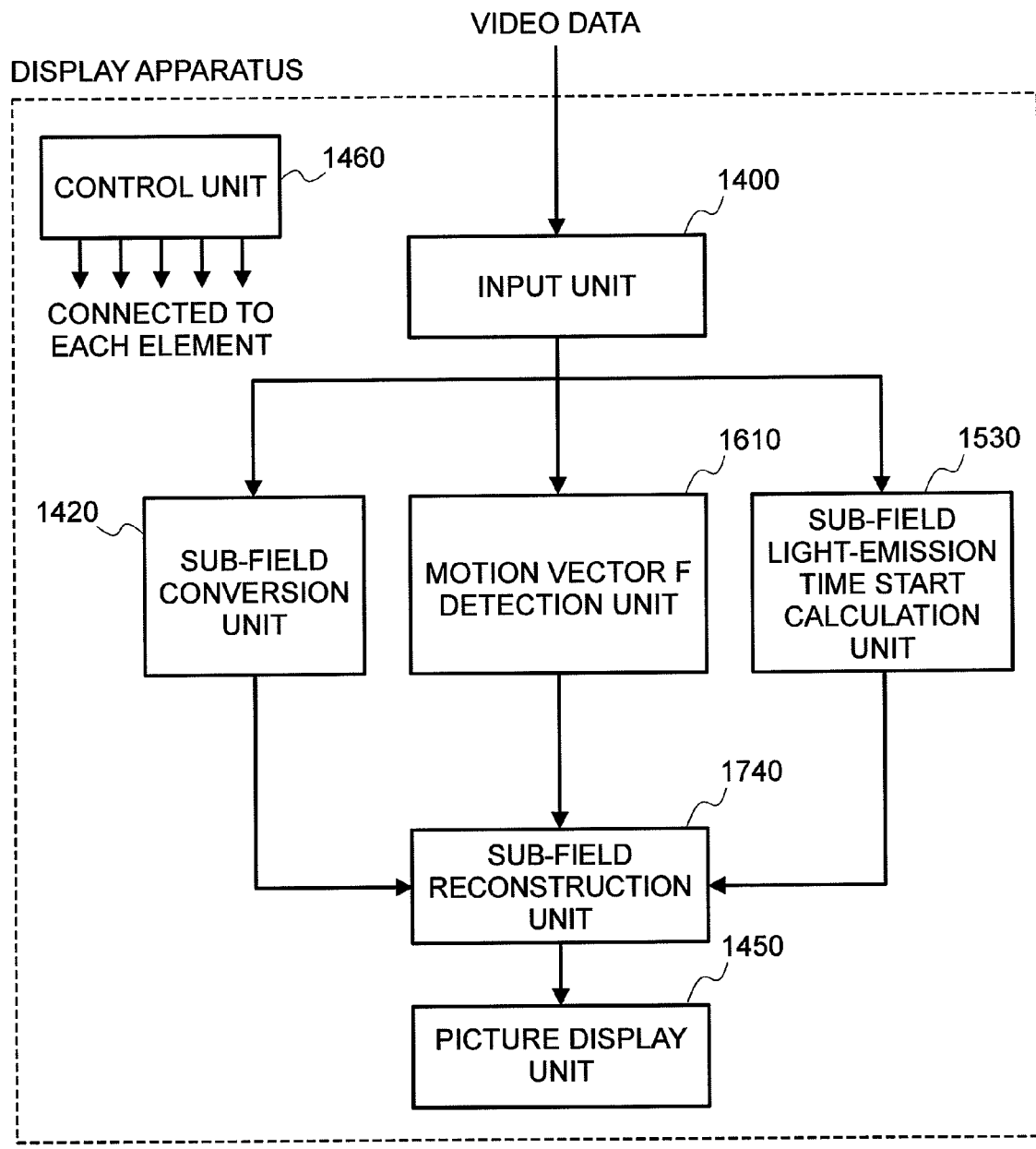
FIG. 17 is a block diagram for showing an example of a displaying apparatus, according to further other embodiment of the present invention.

FIG. 17 is a block diagram for showing an example of the display apparatus, according to the fourth embodiment of the present invention. The display apparatus shown in FIG. 17 comprises, for example, an input unit 1400, a motive vector F detection unit 1610, a sub-field conversion unit 1420, a sub-field light-emission time calculation unit 1530, a sub-field reconstruction unit 1740, a video display unit 1450, and a control unit 1460. With the operations of the input unit 1400, the sub-field conversion unit 1420, the video display unit 1450 and the control unit 1460, since they are same to those in the first embodiment, and therefore explanations of those are omitted herein. Also, with the operation of the motive vector F detection unit 1610, since it is same to that in the third embodiment, and therefore explanation thereof is omitted herein. Herein, the sub-field reconstruction unit 1740 calculates the pixel position of the sub-field before the reconstruction, for re-arranging into the sub-fields of the reconstruction target, in accordance with the (Eq. 6), with using the motion vector F detected by the motive vector F detection unit 1610, the light-emission start time for each sub-field obtained in the sub-field light-emission time calculation unit 1530, the 1 TV field period, and the "α" mentioned above, etc., as the parameters. Herein, although the "α" mentioned above may be calculated within the sub-field reconstruction unit 1740, but it can be also calculated by the control unit 1460, obtaining it from the memory or the like, memorizing therein the 1 TV field period, and the light-emission start time for each sub-field in advance. Further, the sub-field reconstruction unit 1740 obtains the light-emission data of the sub-fields at the pixel position mentioned above of the sub-field data, which is outputted from the sub-field conversion unit 1420. The light-emission data obtained are re-arranged into the sub-fields of the reconstruction target. With repeating this, the sub-fields are reconstructed for each one of the pixels, the reconnection is made on sub-field data obtained in the sub-field conversion unit 1420, and the sub-field data are newly produced for the target field. Those steps 904, 905 and 906 shown in FIG. 9 are executed in the sub-field reconstruction unit 1740, for example. The sub-field data obtained through the operations of the respective parts explained in the above are displayed on the video display unit 1450, as was in the other embodiments. Also, in FIG. 17, the control unit 1460 is connected to each of the elements of the display apparatus shown in FIG. 17. The operation for each of the elements of the display apparatus shown in FIG. 17 may autonomous one of the each element, as was mentioned above, or may be operated upon an instruction of the control unit 1460, for example. Also, the steps 906 and 907, etc., shown in FIG. 9 may be conducted within the control unit 1460, for example.

With the display method according to the fourth embodiment explained in the above, it is possible to produce one (1) piece of new field through the reconstruction of one (1) piece of the target field. Repeating this while changing the target field enables to produce a plural number of new fields, and thereby to display the picture.

With the fourth embodiment explained in the above, all of the sub-fields of the entire pixels are re-set while disposing the sub-fields by taking the visual axis path into the consideration thereof. With this, it is possible to prevent the sub-fields from non-disposition thereof while suppressing the blur of motion picture or the dynamic false contour from generation thereof. Also, within the display method of making the light-emission start time for each sub-field variable, depending on the display load ratio of the picture or the like, for example, it is possible to achieve the reconstruction of the sub-fields, so that the visual axis of the user can trace on the light emitting sub-fields, much more suitably. Also, it is possible to achieve this with an amount of calculations, being less much more. Further, it is possible to reduce an amount of movement of the sub-fields when reconstructing the sub-fields, and thereby to suppress the flickering or the like of the picture. With this, there can be achieved an effect of obtaining the picture, i.e., being natural much more.

In the example mentioned above, the explanation was given on the case where the sub-field emits the light earlier than the light-emission start time for each of the sub-fields at the equal distance, but the similar effect can be obtained by conducting the reconstruction of the sub-fields, with using the (Eq. 6), even in the case where the sub-field emits the light later, i.e., increasing the inclination of the visual axis path.

Also, in the third or the fourth embodiment of the present invention, the explanation was given on the case where the intermediate field B is disposed at the middle point between the fields locating before and after thereof, but the similar effect can be obtained, even in the case where the intermediate field is located at the position other than that middle point between the fields before and after.

Also, in each of the embodiments of the present invention, although the explanation was given by taking the light-emission start time of the sub-field, as the example of the light-emission position of the sub-field, but this is an example of a time parameter indicative of the light-emission of the sub-field, and may be also a parameter other than the light-emission start time of the sub-field. For example, the length of the light-emission period, between starting of the light-emission of the sub-field and ending of the light-emission thereof, may be used as the parameter.

Also, in each of the embodiments of the present invention, although the explanation was given with using the one-dimensional value relating only to the horizontal direction, as an example, in relation to the motion vector V and Vf, but the similar effect can be obtained even if it is the two-dimensional value.

Also, in each of the embodiments of the present invention, although the explanation was given on the case where the number of the sub-fields is six (6), in each thereof, for example, but the similar effect can be obtained in the case where the number of the sub-fields is that other than six (6).

Further, each of those four (4) embodiments, which are explained in the above, has it's own advantageous effect. For example, the first embodiment has an effect of reducing an amount of calculation thereof, while preventing the picture quality from being deteriorated. Also, the second embodiment has an effect of suppressing the blur of motion picture or the dynamic false contour from generation thereof, more suitably. For example, the third embodiment, enabling to suppress the flickering or the like of the picture, has an effect of obtaining the picture, being natural much more. Also, it enables to reduce an amount of calculation thereof. The fourth embodiment, for example, has an effect of suppressing the blur of motion picture or the dynamic false contour from generation thereof, more suitably, and further in addition thereof, an effect of enabling to suppress the flickering or the like of the picture.

However, combining each one of the embodiments shown in those figures for each method, etc., may be an embodiment of the present invention.

With each of those embodiments explained in the above, it is possible to protect or prevent the picture quality, from being deteriorated.

What is claimed is:

1. A video displaying apparatus, for dividing one (1) field period within an input motion picture into a plural number of sub-field periods, and thereby controlling light-ON or light-OFF of the plural number of sub-field periods during each period, comprising:

an input unit, which is configured to input a motion picture;
   a motion vector detection unit, which is configured to detect a motion vector starting from a pixel of one (1) field and ending at a pixel of other one (1) field, among a plural number of fields included in the motion pictures, which are inputted into said input unit, or fields, which are produced from said plural number of fields;
   a sub-field conversion unit, which is configured to convert the motion pictures, which are inputted to said input unit, into light-emission data for sub-fields;
   a sub-field reconstruction unit, which is configured to reconstruct the light-emission data for sub-fields, which is outputted from said sub-field conversion unit, through a calculating process with using the motion vector, which is detected by said motion vector detection unit:
   a display unit, which is configured to display the picture with using the light-emission data, which is outputted from said sub-field reconstruction unit.

wherein said sub-field reconstruction unit selects the motion vector ending at a reconstruction target pixel of said other one (1) field, among the motion vectors detected by said motion vector detection unit, and calculates a position vector, by multiplying a predetermined function onto the motion vector ending at said reconstruction target pixel, whereby reconstructing the light-emission data for one (1) sub-field of said reconstruction target pixel, with using the light-emission data for sub-fields corresponding to said one (1) sub-fields within the pixel, which is indicated by said position vector, upon basis of said reconstruction target pixel;
   wherein said sub-field reconstruction unit calculates the position vector by multiplying the predetermined function onto the motion vector ending at said reconstruction target pixel, for each of the sub-fields of said reconstruction target pixel on said other one (1) field, and reconstructs the light-emission data for each of the sub-fields on said reconstruction target pixel, with using the light-emission data for the sub-field corresponding to said each sub-field within the pixel, which is indicated by said position vector, upon basis of said reconstruction target pixel;
   said motion vector detection unit detects the motion vector, starting from the pixel on a second field included within the motion pictures, which are inputted into said input unit, being time-sequentially disposed prior to a first field included in the motion pictures, which are inputted into said input unit, and ending at the pixel of said first field; and
   said sub-field reconstruction unit selects the motion vector starting from the pixel on said second field and ending at said reconstruction target pixel on said first field, among said vectors detected, and obtains the position vector, by multiplying—(i−1)/N onto said motion vector selected, in case where reconstructing is made upon $i^{th}$ sub-field among N pieces of sub-fields of said reconstruction target pixels on said first field.

2. The video displaying apparatus, as described in the claim 1, wherein
   said motion vector detection unit detects the motion vector, starting from the pixel on a second field included in the motion pictures inputted into said input unit, being time-sequentially disposed prior to a first field included within the motion pictures, which are inputted into said input unit, and ending at the pixel of said first field; and
   said sub-field reconstruction unit selects the motion vector starting from the pixel on said second field and ending at said reconstruction target pixel on said first field, among said vectors detected, and obtains the position vector, by multiplying—Si/Tf onto said motion selected, in case where reconstructing is made upon $i^{th}$ sub-field, wherein 1 TV field period is "Tf" between said first field and said second field and time is "Si" from starting of said 1 TV field period to starting of light emission of the $i^{th}$ sub-field, about said reconstruction target pixel of said first field.

3. The video displaying apparatus, as described in the claim 1, wherein
   said motion vector detection unit detects the motion vector, ending at a pixel on a third field, being disposed between a first field included within the motion pictures inputted into said input unit, and a second field included within the motion pictures inputted into said input unit, being time-sequentially disposed prior to said first field, and starting from the pixel on said second field; and said sub-field reconstruction unit selects the motion vector starting from the pixel on said second field and ending at said reconstruction target pixel on said third field, among said vectors detected, and obtains said position vector by multiplying—((i−1)−(N×α))/(N×α) onto said motion vector selected, with using a value α, being a ratio of a period defined between said second field and said third field with respect to that defined between said second field and said first field, in case where reconstructing is made upon $i^{th}$ sub-field, among N pieces of sub-fields of said reconstruction target pixel on said third field or said first field or said second field.

4. The video displaying apparatus, as described in the claim 1, wherein
said motion vector detection unit detects the motion vector, ending at a pixel on a third field, being disposed between a first field included within the motion pictures inputted into said input unit, and a second field included within the motion pictures inputted into said input unit, being time-sequentially disposed prior to said first field, and starting from the pixel on said second field; and
said sub-field reconstruction unit selects the motion vector starting from the pixel on said second field and ending at said reconstruction target pixel on said third field, among said vectors detected, and obtains the position vector, by multiplying—(Si−(Tf×α)/(Tf×α) onto said motion vector selected, with using a value α, being a ratio of a period defined between said second field and said third field with respect to that defined between said second field and said first field, in case where reconstructing is made upon $i^{th}$ sub-field, wherein 1 TV field period is "Tf" between said first field and said second field and time is "Si" from starting of said 1 TV field period to starting of light emission of the $i^{th}$ sub-field, about said reconstruction target pixel of said third field, or said first field or said second field.

5. The video displaying apparatus, as described in the claim 1, wherein
a distance of the light-emission start time is equal for each of said sub-fields.

6. The video displaying apparatus, as described in the claim 2, wherein
a distance of the light-emission start time for each of said sub-fields is variable depending on a parameter relating to brightness of the picture.

7. The video displaying apparatus, as described in the claim 1, wherein
detection of the motion vector starting from the pixel on said second field and ending at the pixel on said first field by means of said motion vector detection unit, and also reconstruction of the sub-fields for each of said reconstruction targets by means of said sub-field reconstruction unit are conducted upon all of the pixels on said first field, and thereby reconstructing the light-emission data for each of the sub-fields building up said first field.

8. The video displaying apparatus, as described in the claim 3, wherein
said motion vector detection unit detects the motion vectors, each starting from the pixel on said second field and ending at the pixel on said third field, for all of the pixels on said third field; and
said sub-field reconstruction unit reconstructs the sub-fields, for all of the pixels on any one of said third field, said first field and said second field, with using said motion vector detected.

9. A video displaying method, for dividing one (1) field period within an input motion picture into a plural number of sub-field periods, and thereby controlling light-ON or light-OFF of the plural number of sub-field periods during each period, comprising:
inputting a motion picture;
detecting a motion vector starting from a pixel of one (1) field and ending at a pixel of other one (1) field, among a plural number of fields included in the motion pictures, which are inputted via said inputting, or fields, which are produced from said plural number of fields;
converting the motion pictures, which are inputted via said inputting, into light-emission data for sub-fields;
reconstructing the light-emission data for sub-fields, which is outputted from said converting, through a calculating process with using the motion vector, which is detected in said detecting; and
displaying the picture with using the light-emission data, which is outputted from said reconstructing, wherein
said reconstructing selects the motion vector ending at a reconstruction target pixel of said other one (1) field, among the motion vectors detected in said detecting, and calculates a position vector, by multiplying a predetermined function onto the motion vector ending at said reconstruction target pixel, whereby reconstructing the light-emission data for one (1) sub-field of said reconstruction target pixel, with using the light-emission data for sub-fields corresponding to said one (1) sub-fields within the pixel, which is indicated by said position vector, upon basis of said reconstruction target pixel;
wherein said reconstructing calculates the position vector by multiplying the predetermined function onto the motion vector ending at said reconstruction target pixel, for each of the sub-fields of said reconstruction target pixel on said other one (1) field, and reconstructs the light-emission data for each of the sub-fields on said reconstruction target pixel, with using the light-emission data for the sub-field corresponding to said each sub-field within the pixel, which is indicated by said position vector, upon basis of said reconstruction target pixel;
said detecting detects the motion vector, starting from the pixel on a second field included within the motion pictures, which are inputted via said inputting, being time-sequentially disposed prior to a first field included in the motion pictures, which are inputted via said inputting, and ending at the pixel of said first field; and
said reconstructing selects the motion vector starting from the pixel on said second field and ending at said reconstruction target pixel on said first field, among said vectors detected, and obtains the position vector, by multiplying—(i−1)/N onto said motion vector selected, in case where reconstructing is made upon $i^{th}$ sub-field among N pieces of sub-fields of said reconstruction target pixels on said first field.

10. The video displaying method, as described in the claim 9, wherein
said detecting detects the motion vector, starting from the pixel on a second field included in the motion pictures inputted via the inputting, being time-sequentially disposed prior to a first field included within the motion pictures, which are inputted via said inputting, and ending at the pixel of said first field; and
said reconstructing selects the motion vector starting from the pixel on said second field and ending at said reconstruction target pixel on said first field, among said vectors detected, and obtains the position vector, by multiplying—Si/Tf onto said motion selected, in case where reconstructing is made upon $i^{th}$ sub-field, wherein 1 TV field period is "Tf" between said first field and said second field and time is "Si" from starting of said 1 TV field period to starting of light emission of the $i^{th}$ sub-field, about said reconstruction target pixel of said first field.

11. The video displaying method, as described in the claim 9, wherein
said detecting detects the motion vector, ending at a pixel on a third field, being disposed between a first field included within the motion pictures inputted via said inputting, and a second field included within the motion pictures inputted via said inputting, being time-sequentially disposed prior to said first field, and starting from the pixel on said second field; and
said reconstructing selects the motion vector starting from the pixel on said second field and ending at said reconstruction target pixel on said third field, among said vectors detected, and obtains said position vector by multiplying—$((i-1)-(N\times\alpha))/(N\times\alpha)$ onto said motion vector selected, with using a value $\alpha$, being a ratio of a period defined between said second field and said third field with respect to that defined between said second field and said first field, in case where reconstructing is made upon $i^{th}$ sub-field, among N pieces of sub-fields of said reconstruction target pixel on said third field or said first field or said second field.

12. The video displaying method, as described in the claim 9, wherein
said detecting detects the motion vector, ending at a pixel on a third field, being disposed between a first field included within the motion pictures inputted via said inputting, and a second field included within the motion pictures inputted via said inputting, being time-sequentially disposed prior to said first field, and starting from the pixel on said second field; and
said reconstructing selects the motion vector starting from the pixel on said second field and ending at said reconstruction target pixel on said third field, among said vectors detected, and obtains the position vector, by multiplying—$(Si-(Tf\times\alpha))/(Tf\times\alpha)$ onto said motion vector selected, with using a value $\alpha$, being a ratio of a period defined between said second field and said third field with respect to that defined between said second field and said first field, in case where reconstructing is made upon $i^{th}$ sub-field, wherein 1 TV field period is "Tf" between said first field and said second field and time is "Si" from starting of said 1 TV field period to starting of light emission of the $i^{th}$ sub-field, about said reconstruction target pixel of said third field, or said first field or said second field.

13. The video displaying method, as described in the claim 9, wherein
a distance of the light-emission start time is equal for each of said sub-fields.

14. The video displaying method, as described in the claim 10, wherein
a distance of the light-emission start time for each of said sub-fields is variable depending on a parameter relating to brightness of the picture.

15. The video displaying method, as described in the claim 9, wherein
detection of the motion vector starting from the pixel on said second field and ending at the pixel on said first field within said detecting, and also reconstruction of the sub-fields for each of said reconstruction targets within said reconstructing are conducted upon all of the pixels on said first field, and thereby reconstructing the light-emission data for each of the sub-fields building up said first field.

16. The video displaying method, as described in the claim 11, wherein
said detecting detects the motion vectors, each starting from the pixel on said second field and ending at the pixel on said third field, for all of the pixels on said third field; and
said reconstructing reconstructs the sub-fields, for all of the pixels on any one of said third field, said first field and said second field, with using said motion vector detected.

* * * * *